US012572963B2

(12) United States Patent
Williams et al.

(10) Patent No.: US 12,572,963 B2
(45) Date of Patent: Mar. 10, 2026

(54) CHARGING FOR THE USE OF RESOURCES IN A DISTRIBUTED NETWORK

(71) Applicant: DFINITY STIFTUNG, Zurich (CH)

(72) Inventors: Dominic Williams, Palo Alto, CA (US); Jan Camenisch, Thalwil (CH); David Mccauley, Palo Alto, CA (US)

(73) Assignee: DFINITY STIFTUNG, Zürich (CH)

( * ) Notice: Subject to any disclaimer, the term of this patent is extended or adjusted under 35 U.S.C. 154(b) by 139 days.

(21) Appl. No.: 17/769,906

(22) PCT Filed: Oct. 18, 2019

(86) PCT No.: PCT/EP2019/078414
§ 371 (c)(1),
(2) Date: Apr. 18, 2022

(87) PCT Pub. No.: WO2021/073758
PCT Pub. Date: Apr. 22, 2021

(65) Prior Publication Data
US 2022/0374951 A1 Nov. 24, 2022

(51) Int. Cl.
*H04L 67/60* (2022.01)
*G06Q 30/0283* (2023.01)
(Continued)

(52) U.S. Cl.
CPC ......... *G06Q 30/0283* (2013.01); *G06Q 50/06* (2013.01); *H04L 12/1439* (2013.01); *H04L 12/1457* (2013.01); *H04L 67/60* (2022.05)

(58) Field of Classification Search
CPC ............... G06Q 30/0283; G06Q 50/06; H04L 12/1457; H04L 2209/56; H04L 67/10; H04L 12/14; H04L 12/1439
USPC ........................................................ 705/30
See application file for complete search history.

(56) References Cited

U.S. PATENT DOCUMENTS

| | | | |
|---|---|---|---|
| 11,438,462 B2* | 9/2022 | Chai ..................... | H04M 15/62 |
| 2004/0117224 A1* | 6/2004 | Agarwal ............ | G06Q 20/1235 |
| | | | 705/412 |

(Continued)

FOREIGN PATENT DOCUMENTS

| | | |
|---|---|---|
| JP | 2004326452 A | 11/2004 |
| JP | 2005056201 A | 3/2005 |

(Continued)

OTHER PUBLICATIONS

Timo Hanke, et al., "DFINITY Technology Overview Series Consensus System", Proceedings of Technology Overview Series, Jan. 23, 2018, 16 pages.

(Continued)

*Primary Examiner* — Ariel J Yu
*Assistant Examiner* — Denisse Y Ortiz Roman
(74) *Attorney, Agent, or Firm* — Mannava & Kang, P.C.

(57) ABSTRACT

An aspect of the invention relates to a computer-implemented method for charging and paying for a use of resources of a distributed network. The distributed network comprises a plurality of nodes, wherein each of the plurality of nodes is configured to run one or more computational units. The one or more computational units comprise one or more application units for providing application services to users of the distributed network. The embodied method comprises steps of running, by each user of the network, one or more local user gas accounts at one or more of the application units and processing, via the local user gas accounts, payments for the use of the resources of the distributed network.

Further aspects relate to a distributed network, a node of a distributed network and a corresponding computer program product.

18 Claims, 12 Drawing Sheets

100

(51) Int. Cl.
   *G06Q 50/06*     (2024.01)
   *H04L 12/14*     (2024.01)

(56)        References Cited

U.S. PATENT DOCUMENTS

| | | | |
|---|---|---|---|
| 2011/0004690 A1* | 1/2011 | Georgel | H04L 47/10 |
| | | | 709/227 |
| 2014/0211665 A1 | 7/2014 | Voccio et al. | |
| 2018/0006872 A1* | 1/2018 | Johnson | H04L 67/10 |
| 2018/0293557 A1* | 10/2018 | Kim | G06Q 20/3825 |
| 2019/0108542 A1 | 4/2019 | Durvasula et al. | |
| 2019/0251199 A1 | 8/2019 | Klianev | |

FOREIGN PATENT DOCUMENTS

| | | | |
|---|---|---|---|
| JP | 2016510448 A | 4/2016 | |
| JP | 2019133419 A | 8/2019 | |
| JP | 6721903 B2 | 7/2020 | |
| KR | 100635035 B1 * | 10/2006 | |
| KR | 101949711 B1 | 2/2019 | |
| WO | 2010137455 A1 | 12/2010 | |
| WO | 2016049379 A1 | 3/2016 | |

OTHER PUBLICATIONS

International Search Report for International Application No. PCT/EP2019/078414 mailed on Jul. 15, 2020, pp. 4.

Yeo-Hao Chin et al., "A Secure Billing Protocol for Grid Computing", 6th International Conference on Information Technology: New Generations, IEEE, Apr. 27, 2009, pp. 320-325.

European Patent Office, "Communication pursuant to Article 94(3) EPC Office action for EP application No. 1 19791216.5", dated Mar. 5, 2025, 14 pages.

* cited by examiner

SS1

SS2

10

10

11

11

11

11

10

10

10

10

_100_

SS2

10

15

$CU_{21}$ $CU_{22}$ $CU_{23}$

15

$CU_{24}$ $CU_{25}$

_200_

16

SNB

SNA-SNB

SNC-SNB

SND-SNB

CSNB   IB   MSNB 30      31

11

500

42

Replicated and deterministic computation

Execution   62   State Reader   69      User 65                65a         67

Messaging   61   State Manager   Cert.   Ingress Mess. Handler   User

Consensus   63                                    610, 41

Networking   64   X-Net   66            Mainnet Reader

68

Crypto   Secur.

611, 43

600

800

900

1000

1100

1100

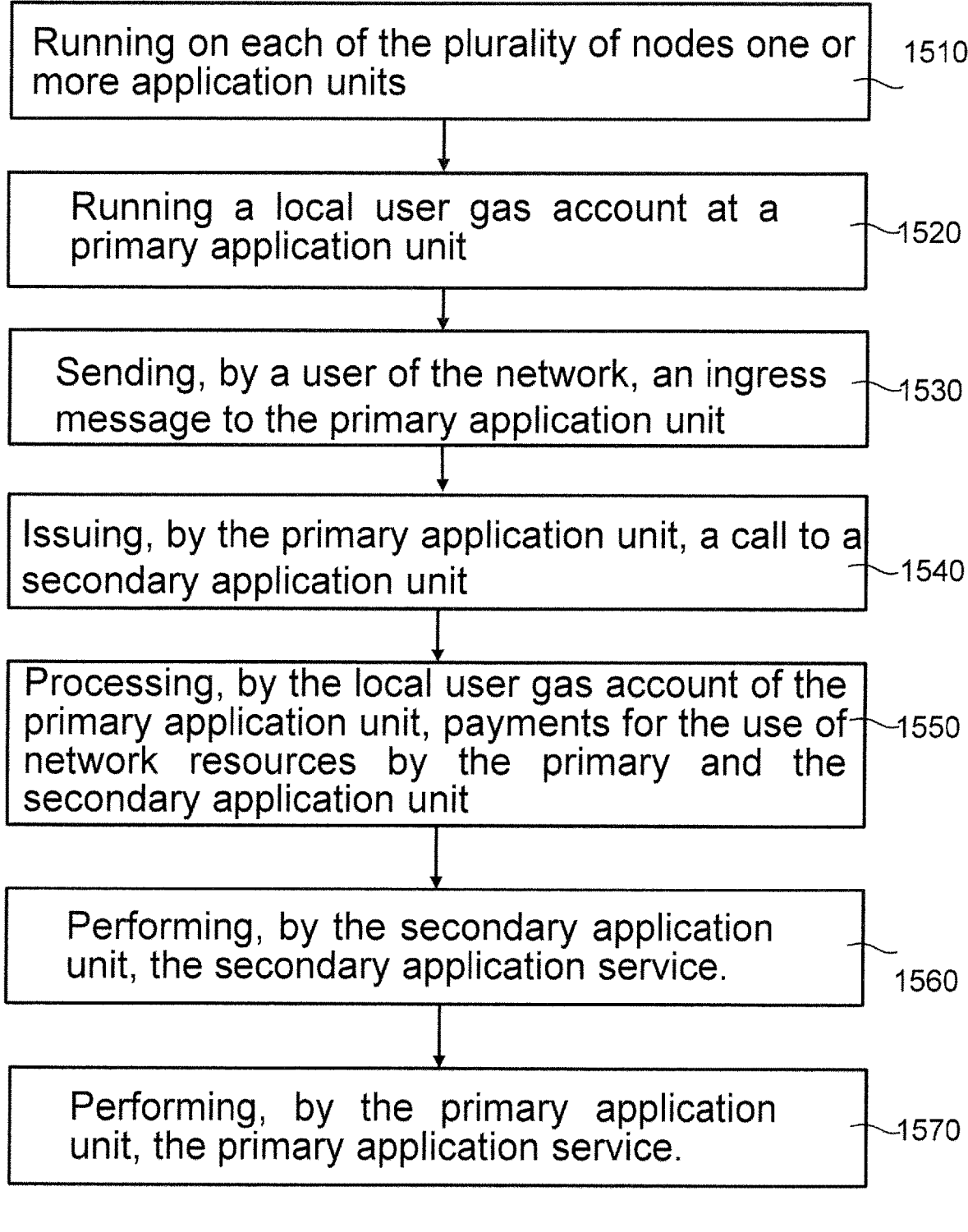

Running on each of the plurality of nodes one or more application units　　1510

Running a local user gas account at a primary application unit　　1520

Sending, by a user of the network, an ingress message to the primary application unit　　1530

Issuing, by the primary application unit, a call to a secondary application unit　　1540

Processing, by the local user gas account of the primary application unit, payments for the use of network resources by the primary and the secondary application unit　　1550

Performing, by the secondary application unit, the secondary application service.　　1560

Performing, by the primary application unit, the primary application service.　　1570

| Mainnet Protocol Client | Subnet Protocol Client | Security |

40  Node manager

<u>1600</u>

51  Messaging

52  Consensus  Consensus  Consensus  Consensus

53  P2P  P2P  P2P  P2P

<u>1700</u>

1801        1802        1803

1800

1900

CHARGING FOR THE USE OF RESOURCES IN A DISTRIBUTED NETWORK

CLAIM FOR PRIORITY

The present application is a national stage filing under 35 U.S.C 371 of PCT application number PCT/EP2019/078414, having an international filing date of Oct. 18, 2019, the disclosure of which is hereby incorporated by reference in its entirety.

TECHNICAL FIELD

The present invention pertains to a computer-implemented method for charging for a use of resources of a distributed network.

Further aspects relate to a distributed network, a node of a distributed network, a corresponding computer program product and a software architecture encoded on a non-transitory medium.

BACKGROUND ART

In distributed networks a plurality of nodes are arranged in a distributed fashion. In distributed networks computing, software and data are spread out across the plurality of nodes. The nodes establish computing resources and the distributed networks may use distributed computing techniques.

An example of distributed networks are blockchain networks. Blockchain networks are consensus-based, electronic ledgers based on blocks. Each block comprises transactions and other information. Furthermore, each block contains a hash of the previous block so that blocks become chained together to create a permanent, unalterable record of all transactions which have been written to the blockchain. Transactions may call small programs known e.g. as smart contracts.

In order for a transaction to be written to the blockchain, it must be "validated" and agreed upon by the network. In other words, the network nodes have to reach consensus on blocks to be written to the blockchain. Such consensus may be achieved by various consensus protocols.

In one type of blockchain networks, consensus is achieved by using a proof-of-work algorithm. A proof-of-work consensus protocol generally requires some work from the parties that participate in the consensus protocol, usually corresponding to processing time by a computer. Proof-of-work-based cryptocurrency systems such as Bitcoin involve the solving of computationally intensive puzzles to validate transactions and to create new blocks.

Another type of consensus protocols is based on a proof-of-stake algorithm. Such proof-of-stake protocols have the advantage that they do not require time-consuming and energy-intensive computing. In proof-of-stake based blockchain networks e.g. the creator of the next block is chosen via combinations of random selection as well as the stake of the respective node in the network.

Consensus protocols used in blockchain networks can be designed to reach fast finality on transactions contained in blocks by applying a "Byzantine fault tolerant" (BFT) agreement protocol. "Synchronous" BET protocols rely on network synchrony assumptions for safety, while "asynchronous" BFT protocols do not. Asynchronous BFT protocols can typically tolerate less than ⅓ (one third) corrupt participating nodes.

Apart from cryptocurrencies, distributed networks may be used for various other applications. In particular, they may be used for providing decentralized and distributed computing capabilities and services. To this end, distributed networks may use a state machine replication protocol to reliably run applications and store states across multiple nodes even in the presence of crashing nodes and adversarial attacks.

US 2018/0006372 discloses a data plane API in a distributed computing network. Embodiments are directed to a distributed computing system comprising a plurality of compute nodes for providing resources to users and a hierarchy of two or more layers of controllers coupling the compute nodes to a user interface via a control plane, wherein at least one compute node receives a local application program interface (API) call from an application running on the at least compute node, the local API call causing the at least one compute node to configure a local resource without requiring commands from the control plane.

US 2004/0117224 A1 discloses an apparatus for metering and accounting in a commercial e-services infrastructure. It addresses the requirement for handling composite services in which higher-level services are built using simpler underlying services, each of which may be autonomously owned and operated. Metering records for each service underlying a composite service are correlated, enabling accounting which takes account of the usage and charges associated with the underlying services, on a per-request basis or on an aggregated basis for each customer-provider pair over a given billing period.

US 2014/0211665 A1 discloses a method for generating a billing feed for a distributed network system and reselling resources of the distributed network system. In one embodiment, a method includes observing a plurality of messages sent and received among components of the distributed network system, generating a call flow graph based on the plurality of messages of the distributed network system, and outputting a billing feed for the distributed network based on the call flow graph, to provide a billing feed including one or more billable events.

US 2011/0004690 A1 discloses a method of forwarding messages over a network. The message forwarding method is implemented in a router of a distributed network comprising, at the level of the OSI layer 7, at least one sub network being constrained, the method comprising at least the following steps: processing a unique format for the whole set of messages; for a given message, identifying the next routers to be reached in order to forward the message to its recipient or recipients; for a given message, identifying the transmission service quality; assigning priorities to the messages as a function of the service quality requirements identified in the previous step; adapting the content of the message so as to pass through a constrained sub-network.

One challenge of such distributed networks which provide distributed computing services is to provide efficient, flexible and secure charging mechanisms to charge users as well as applications for the use of the network resources provided by the distributed network.

DISCLOSURE OF THE INVENTION

Accordingly, one object of an aspect of the invention is to provide a method for charging for a use of network resources of a distributed network, in particular a method that provides an advantageous resource payment or resource charging for computational resources of the distributed network, in particular in terms of efficiency, flexibility and/or security.

According to an embodiment of a first aspect of the invention, there is provided a computer-implemented method for charging or paying for a use of resources of a distributed network. The distributed network comprises a plurality of nodes, wherein each of the plurality of nodes is configured to run one or more computational units. The one or more computational units comprise one or more application units for providing application services to users of the distributed network. The embodied method comprises steps of running, by a user of the network, in particular by each user of the network, one or more local user gas accounts at one or more of the application units and processing, via or by the one or more local user gas accounts, charges for the use of the resources of the distributed network. A local user gas account is a local user accounting unit configured to locally pay for the use of resources of the distributed network.

According to such an embodied method local user gas accounts are provided at one or more of the application units. Such local user gas accounts may facilitate an efficient and flexible charging and payment for the use of resources by the user. In particular, the provision of local user gas accounts may effectively reduce the number of messages which are needed to process the payments and hence may effectively reduce the communication traffic and the associated bandwidth of the distributed network.

A local user gas account is an account that is run at the respective application unit, but which is owned by the corresponding user. The local user gas account is used to locally pay for the use of the resources of the distributed network. A local user gas account may also be denoted as local user accounting unit.

A resource may generally be any physical or virtual resource of the distributed network and may also be denoted as network resource. These resources may include computational resources such as the processing power of processors of the distributed network, memory and storage resources as well as network connections and their associated bandwidth, e.g. for the communication between different application units.

The resources may be provided in particular by the nodes of the network. The nodes of the network may be embodied as computing systems or computing units, e.g. as servers.

The charges or in other words the payments for the use of the resources may be in particular processed in gas or gas units. Gas may be defined as a complementary accounting unit that is used by the distributed network to charge for the use of its resources and is separate from the native currency of the network. Gas may also be denoted as fuel. Providing a complementary accounting unit provides the advantage that the costs for the use of the resources can be kept stable and independent from market fluctuations of the currency. As an analogy to a car, like fuel or gas is needed to run a car, the gas according to embodiments of the invention is needed to run the resources of the distributed network.

The terms "charges" and "payments" shall be understood in a broad sense. They may include payments which are deducted from the local user gas account and transferred to another account, but they may also include application schemes according to which the used gas is not transferred to another account, but just "burned" after its use. In other words, the gas may be "burned" or consumed to "pay" for the use of the resources, but it will be eliminated from the network after its use. In this respect the terms "charges" and "payments" may be used in an interchangeable way.

A computational unit may be defined as a piece of software that is running on a node of the network and which has its own unit state. According to embodiments, a computational unit may be defined as a deterministic program with orthogonal persistence.

An application unit is a computational unit that is configured to provide application services to users of the network. Such application services may encompass e.g. the hosting of a website, the booking of a trip, the provision of a messaging service etc.

According to embodiments, each node of the network runs one or more computational units and hence maintains the unit state of one or more computational units.

According to an embodiment, the method comprises further steps of sending, by a user of the network, an ingress message for requesting a primary application service to a primary application unit of the one or more application units and performing, by the primary application unit, the primary application service. A further step includes processing, via or by the local user gas account of the user at the primary application unit, charges or payments for the use of the resources by the primary application service.

According to such an embodiment, the primary application unit establishes the entry point for the ingress message of the user. An ingress message shall be understood as a message that is sent by a user of the distributed network to one of the application units of the network, more particularly to a respective primary application unit. According to such an embodiment, the user needs to have a local user gas account at least at the respective primary application unit. This allows to locally process charges or payments for the use of the resources via or by the local user gas account at the primary application unit.

According to an embodiment, the step of performing the primary application service comprises issuing, by the primary application unit, one or more calls to one or more secondary application units.

Such a secondary application unit shall be understood as an application unit that does not directly receive an ingress message from the user, but a call from the respective primary application unit that has received an ingress message. In other words, in order to perform the primary application service, the primary application unit involves the secondary application unit and requests support of the secondary application unit by means of a call to the secondary application unit.

It should be noted that the role of an application unit may change over time and may depend in particular on the respective ingress message and the corresponding application service. More particularly, the same application unit may serve in one instance as primary application unit if it receives an ingress message that requests a primary application service. And in another instance, the same application unit may serve as a secondary application unit if it receives a call from another application unit serving as primary application unit.

According to such an embodiment, the method may further comprise the steps of performing, by the one or more secondary application units, one or more secondary application services.

According to an embodiment, the method may further comprise processing, via or by the local user gas account of the primary application unit, payments for the use of the resources by the secondary application services.

Hence the secondary application units support the primary application unit by performing the secondary application services, while the primary application unit arranges the payment for the use of the resources which the secondary application units need for the execution of the secondary application services.

This provides an efficient payment scheme. More particularly, it avoids that the user needs a separate gas account at the secondary application units and it avoids any message traffic between e.g. a user currency account and the secondary application units.

According to an embodiment, performing the one or more secondary application services comprises issuing, by the one or more secondary application units, one or more calls to further secondary application units. Furthermore, the method may comprise performing, by the one or more further secondary application units, one or more further secondary application services.

According to an embodiment, the one or more calls may be performed successively, thereby forming a call tree of arbitrary depth.

According to another embodiment, the method may comprise steps of running, by a user of the network, a local user gas account at the secondary application unit and processing, via or by the local user gas account of the secondary application unit, payments for the use of the resources by the secondary application service.

According to such an embodiment, the user needs to have a local user gas account at the primary as well as at the secondary application unit. With such a method the secondary application unit may charge for the use of the resources needed for the execution of the secondary application services directly from the local user gas account held by the respective user at the secondary application unit. Such a scheme provides additional flexibility in the charging, in particular for applications where it is difficult to assess the computational effort for a secondary application service in advance.

According to an embodiment, the method comprises further steps of running, by each user of the network, a wallet computational unit. The wallet computational unit is configured to manage a user currency account for the user. Furthermore, the embodied method may comprise a step of sending a payment message from the wallet computational unit to a respective application unit to transfer a currency amount from the user currency account to the local user gas account at the respective application unit.

Such a method facilitates a flexible and efficient resource charging. The user currency account provided by the wallet computational unit may be e.g. charged by the user from a conventional bank account. In this respect it may provide an (external) interface to various external banking applications or external banking accounts. On the other hand, the user currency account may be used to transfer a currency amount internally from the user currency account to one or more local user gas accounts held by the respective user. This internal currency transfer may be executed by sending a payment message from the wallet computational unit to the application unit which hosts the respective local user gas account.

The wallet computational unit may be run in gas units or in another currency, e.g. in a crypto-currency or a stablecoin pegged to a classical national currency such as US-dollars or Euros. An exchange rate between the crypto-currency or the classical national currency and gas units may be managed by the distributed network, e.g. by a governance system of the distributed network. As an example, the distributed network may provide a global table with one or more exchange rates.

According to embodiments, the distributed network may modulate the exchange rate to give gas an approximately stable cost.

According to a further embodiment, the method comprises a step of running, by each application unit, an application unit gas account.

Such an application unit gas account further facilitates an efficient and flexible charging for the use of resources of the network. The application unit gas account may be used in particular in lieu of or in addition to a local user gas account to pay for application services. Moreover, it can be charged for resources used by the application unit itself, e.g. for its storage use. In addition, the application unit gas accounts may be used to transfer gas between different application units, in particular between the primary and the secondary application units which are involved in a call.

According to an embodiment, the method further comprises charging separately for the acceptance of ingress messages, for read queries, for the execution of accepted ingress messages and/or the execution of accepted unit-to-unit message that are sent between computational units of the network.

Such a separation of the charging allows to implement different technical charging schemes for the different uses of the resources. Furthermore, it can be used to increase the security of the system and to prevent or at least to hinder attacks of adversaries. Furthermore, it facilitates flexible and prompt charging schemes.

According to an embodiment, each of the local user gas accounts may comprise an ingress sub-account configured to be charged for an acceptance of the ingress messages, a read query sub-account configured to be charged for the read queries and an execution sub-account configured to be charged for the execution of messages, in particular the execution of accepted ingress messages and/or accepted unit-to-unit messages.

This may be used to further improve the security of the system and limit the potential damage caused by faulty or malicious application units. In particular, the distributed network may be configured to specify a minimum balance which each of the separate sub-accounts need to have before the distributed network starts to use resources for the respective request. As an example, a new ingress message will only be taken into consideration for acceptance if the respective balance of the ingress sub-account is above the specified minimum ingress balance.

According to a further embodiment, the method comprises applying different accounting periods and/or charging times for the ingress messages, the read queries as well as for the unit-to-unit messages. Such different accounting periods further facilitate different technical implementations of charging schemes and they may be used to prevent or hinder attacks on the distributed network.

According to an embodiment, the method may comprise charging for the ingress messages upon accepting or rejecting them for execution.

According to a further embodiment, the method comprises charging for the execution of the ingress messages in advance, in particular after the issuing of the one or more calls to the secondary application units.

Such embodiments may efficiently prevent or hinder attacks, e.g. by flooding it with ingress messages. More particularly, charging early at different points in time may ensure that the processing of adversary requests stops early, in particular as soon as the respective balance of the sub-account is below the required minimum balance.

According to a further embodiment, the method comprises charging for the read queries subsequently in a bundled way, e.g. only after a predefined number of read queries have been performed.

This facilitates an efficient processing of the read queries. Such an embodiment is in particular useful for distributed networks in which the application units run on a plurality of nodes forming a subnet and are replicated across the plurality of nodes of the subnet. In such a network the read queries do not have to be replicated across the plurality of nodes of the subnet and the read queries can be processed independently by a single node of the subnet.

According to a further embodiment, the method comprises providing a separate read query sub-account for each node of a respective subnet.

This may prevent or hinder attacks on a single node by flooding it with read queries. More particularly, a node may only execute read requests if its separate read query sub-account has a sufficient balance, although the read request are only charged later in a bundled way.

According to another embodiment, the method further comprises charging, by the distributed network, for the use of storage resources of the distributed network and paying, from a respective application unit gas account, for its use of the storage resources of the distributed network.

According to embodiments the respective application unit may be charged e.g. for the maximum amount of storage that has been used in a predefined period of time.

According to a further embodiment, the method comprises charging, by an application unit, in particular by a respective primary and/or secondary application unit, a fixed price for the use of the resources by the primary and/or the secondary application service respectively.

Such a fixed price facilitates on the one hand an efficient payment process with a low use of communication bandwidth. On the other hand it facilitates a prompt charging. Furthermore, it allows to process the payments for the secondary application unit via the local user account of the primary application unit in an elegant and simple way.

According co a further embodiment, the method comprises charging, by an application unit, in particular by a respective primary and/or secondary application unit, an advance payment for the use of the resources by the primary and/or the secondary application service respectively. In addition, the method may comprise a further step of reimbursing, by the application unit, in particular by the respective primary and/or secondary application unit, unused parts of the advance payment.

This provides further flexibility.

According to a further embodiment, the method comprises topping up, from an application unit gas account of a respective primary and/or secondary application unit, the advance payment to ensure execution of the corresponding primary and/or secondary application service.

This provides further flexibility.

According to a further embodiment, the distributed network comprises a plurality of subnets, wherein each of the plurality of subnets comprises one or more of the plurality of nodes. The method further comprises steps of assigning each of the application units to one of the plurality of subnets and replicating the application units across the respective subnet.

Methods according to embodiments of the invention are in particular useful for such distributed networks comprising subnets with replicated application units.

The replication may be in particular facilitated by performing an active replication in space of the unit state of the computational units on each node of the execution subset. According to embodiments, the unit state may comprise in particular an input queue, an output queue, a system state and an application or user state.

According to an embodiment, the distributed network is configured to replicate the set of computational units, in particular the states of the computational units, across the subnet. As a result, the computational units of a respective subnet have always the same state, provided they behave honestly. The different subnets, in particular the computational units of the different subnets, may communicate with each other by exchanging inter-subnet messages via a messaging protocol and a consensus protocol.

According to an embodiment of another aspect of the invention, a distributed network is provided.

The distributed network comprises a plurality of nodes, wherein each of the plurality of nodes is configured to run one or more computational units. The one or more computational units encompass one or more application units. The application units are configured to provide application services to users of the distributed network. The distributed network is configured to provide resources for the computational units and to run, by each user of the network, one or more local user gas accounts at one or more of the application units. The distributed network is further configured to process, via or by the local user gas accounts, payments for the use of the resources of the distributed network.

According to an embodiment of another aspect of the invention, a node of a distributed network is provided.

According to an embodiment of another aspect of the invention, a computer program product for operating a distributed network is provided. The computer program product comprises a computer readable storage medium having program instructions embodied therewith, the program instructions executable by ore or more of a plurality of nodes of the distributed network to cause the one or more of the plurality of nodes to perform steps of the method aspect of the invention.

According to an embodiment of another aspect of the invention, a software architecture encoded on a non-transitory computer readable medium is provided. The software architecture is configured to operate one or more nodes of a distributed network. The encoded software architecture comprises program instructions executable by one or more of the plurality of nodes to cause the one or more of the plurality of nodes to perform a method comprising steps of the method aspects of the invention.

Features and advantages of one aspect of the invention may be applied to the other aspects of the invention as appropriate.

Other advantageous embodiments are listed in the dependent claims as well as in the description below.

BRIEF DESCRIPTION OF THE DRAWINGS

The invention will be better understood and objects other than those set forth above will become apparent from the following detailed description thereof. Such description makes reference to the annexed drawings, wherein:

FIG. 15 shows a flow chart of method steps of a computer-implemented method according to embodiments of the invention;

MODES FOR CARRYING OUT THE INVENTION

At first, some general aspects and terms of embodiments of the invention will be introduced.

According to embodiments, a distributed network comprises a plurality of nodes that are arranged in a distributed fashion. In such a distributed network computing, software and data is distributed across the plurality of nodes. The nodes establish computing resources and the distributed network may use in particular distributed computing techniques.

According to embodiments, distributed networks may be embodied as blockchain networks. The term "blockchain" shall include all forms of electronic, computer-based, distributed ledgers.

Figure 1:
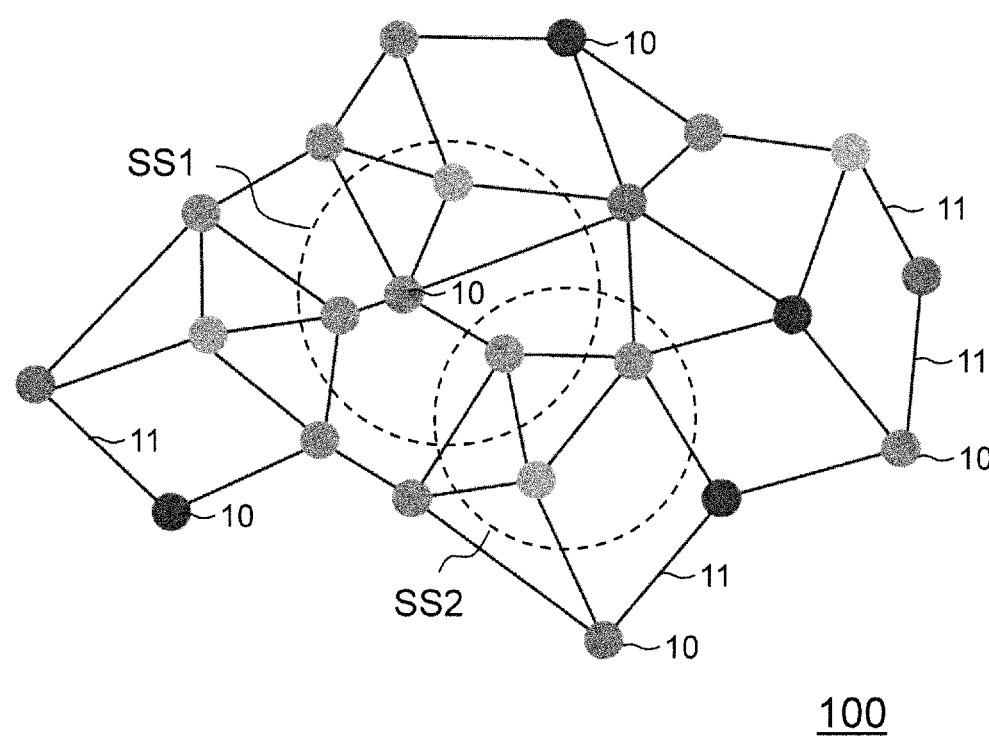
FIG. 1 shows an exemplary diagram of a distributed network according to an embodiment of the invention.

FIG. 1 shows an exemplary block diagram of a distributed network 100 according to an embodiment of the invention.

The distributed network 100 comprises a plurality of nodes 10, which may also be denoted as network nodes 10 or computing nodes 10. Each of the plurality of nodes 10 is configured to run one or more computational units. According to embodiments a computational unit shall be understood as a piece of software, in particular as a piece of software that comprises or has its own unit state.

The plurality of nodes 10 of the network 100 may be allocated to different subsets and/or subnets. Such allocations may change over time.

According to this embodiment, the network 100 comprises a consensus subset SS1 of nodes 10 and an execution subset SS2 of nodes 10.

The computational units that run on the nodes 100 can be used by a user of the network 100 to perform or request computational tasks or services, in particular application services. The computational units of the network 100 may execute in particular execution messages from a current set of execution messages. The execution messages may comprise in particular unit-to-unit messages which are exchanged between the computational units of the network and/or ingress messages, i.e. messages which are received from external sources, in particular from users of the network. The network 100 is configured such that at first a consensus protocol is performed to reach a consensus on a selection and processing order of execution messages from a respective current set of execution messages. Depending on the number of nodes 10 in the network 100, the consensus protocol is advantageously not performed by all nodes of the network, but by only a subset of the nodes 10 of the network 100, which is in the following denoted as consensus subset SS1. The consensus subset SS1 may also be denoted as consensus subset. The nodes of the consensus subset SS1 are accordingly configured to run the consensus protocol to reach a consensus on a selection and processing order of execution messages from the current set of execution messages.

The execution of the execution messages may also advantageously not be performed by all nodes of the network 100, but only by a subset of the nodes 10 of the network 100. This subset is in the following denoted as execution subset SS2 and may be also denoted as execution subset SS2.

The computational units of the execution subset SS2 then execute individually the selection of the execution messages in the processing order as agreed in the previous consensus step. Each of the computational units of the execution subset SS2 performs the execution in a deterministic manner and thereby mutates the unit states of the corresponding computational units of the execution subset SS2.

According to embodiments, a unit state shall be understood as all the data or information that is used by the computational unit, in particular the data that the computational unit stores in variables, but also data which the computational units get from remote calls. The unit state may represent in particular storage locations in the respective memory locations of the respective node. The contents of these memory locations, at any given point in the execution of the computational units, is called the unit state according to embodiments. The computational units may be in particular embodied as stateful computational units, i.e. the computational units are designed according to embodiments to remember preceding events or user interactions.

According to embodiments it is assumed that each node of the network keeps a local clock that is roughly synchronized with the clocks of the other nodes.

Figure 2:
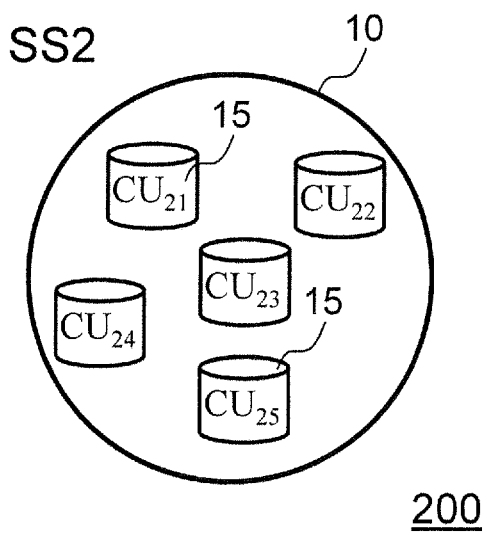
FIG. 2 illustrates in a more detailed way computational units running on an exemplary node of the network.

FIG. 2 illustrates in a more detailed way computational units 15 running on nodes 10 of the network 100. More particularly, FIG. 2 shows a node 10 of the subset SS2 of FIG. 1 on which five computational units 15 are run, more particularly the set of computational units $CU_{21}$, $CU_{22}$, $CU_{23}$, $CU_{24}$ and $CU_{25}$. The set of computational units $CU_{21}$, $CU_{22}$, $CU_{23}$, $CU_{24}$ and $CU_{25}$ runs on each node 10 of the subset SS2. Furthermore, the set of computational units $CU_{21}$, $CU_{22}$, $CU_{23}$, $CU_{24}$ and $CU_{25}$ is replicated across the whole subset SS2 such that each of the computational units $CU_{21}$, $CU_{22}$, $CU_{23}$, $CU_{24}$ and $CU_{25}$ eventually has the same unit state, provided they behave honestly. This may be implemented in particular by performing an active replication in space of the unit state of the computational units $CU_{21}$, $CU_{22}$, $CU_{23}$, $CU_{24}$ and $CU_{25}$ on each of the nodes 10 of the subset SS2.

The computational units CU may serve different functions and may be of different types. One type of computational units are application computational units which are configured to provide application services to users of the distributed network. The application computational units will be in the following denoted as application units or AUs for simplicity reasons. Another type of computational units are wallet computational units which may be configured to manage user currency accounts of users of the network. And yet another type of computational units are system computational units. Such system computational units may provide system or managing functions for the distributed network.

Figures 3, 4:
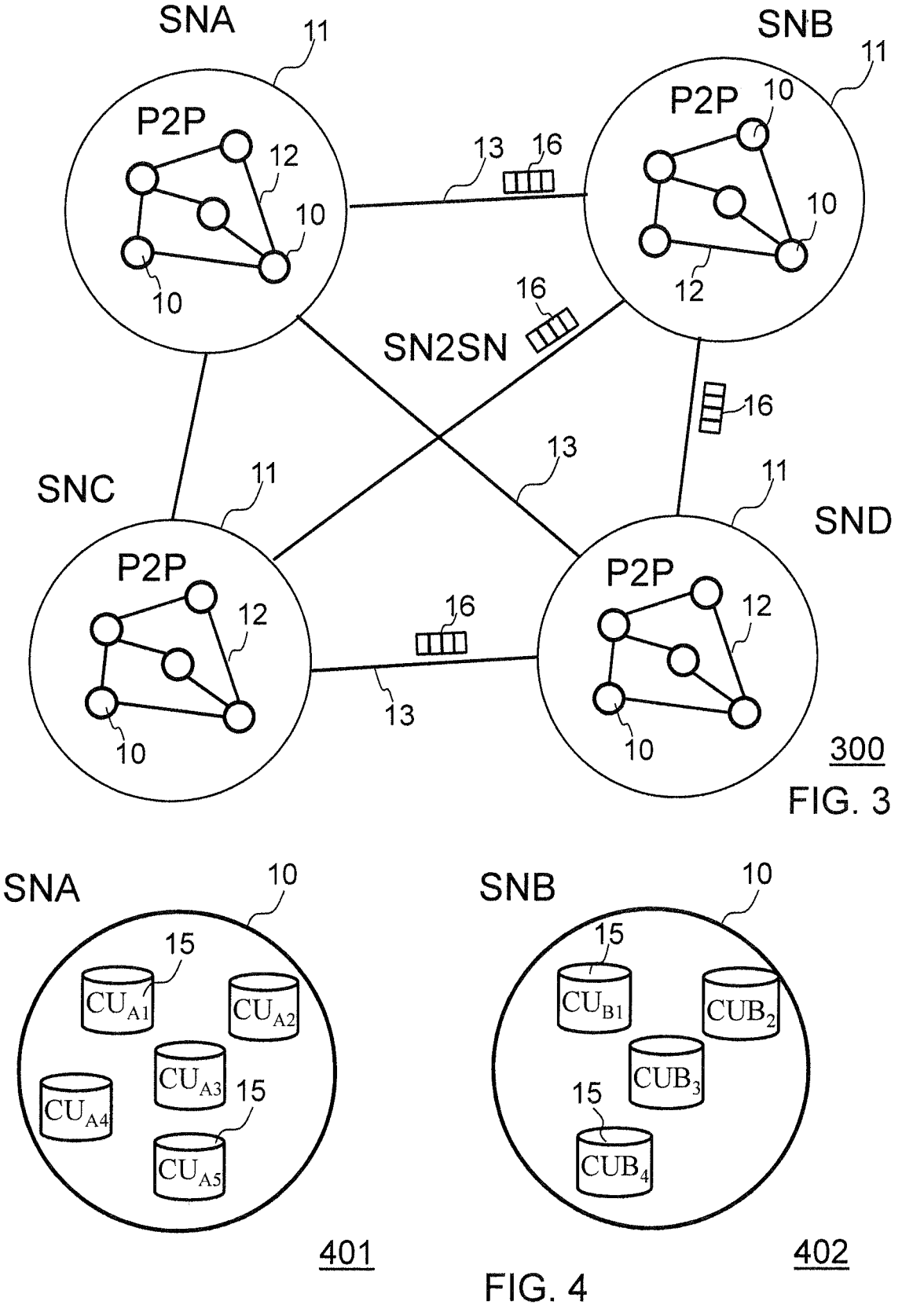
FIG. 3 shows an exemplary diagram of a distributed network according to an embodiment of the invention comprising a plurality of subnets.
FIG. 4 illustrates in a more detailed way computational units running on the distributed network of FIG. 3.

FIG. 3 shows an exemplary block diagram of a distributed network 300 according to an embodiment of the invention.

The distributed network 300 comprises a plurality of nodes 10.

According to this embodiment, the plurality of nodes 10 are distributed over a plurality of subnets 11. In the example of FIG. 1, four subnets 11 denoted with SNA, SNB, SNC and SND are provided. The network 100 comprises communication links 12 for intra-subnet communication within the respective subnet 11 as well as communication links 13 for inter-subnet communication between different ones of the subnets 11. Accordingly, the communication links 12 may also be denoted as intra-subnet or Peer-to-Peer (P2P) communications links and the communication links 13 may also be denoted as inter-subnet or Subnet-to-Subnet (SN2SN) communications links.

Each of the plurality of subnets 11 is configured to run a set of computational units on each node 10 of the respective subnet 11.

According to embodiments of the invention the subnets 11 are configured to replicate the set of computational units across the respective subnet 11. More particularly, the subnets 11 are configured to replicate the unit state of the computational units across the respective subnet 11.

The network 100 may be in particular a proof-of-stake blockchain network.

Proof-of-stake (PoS) describes a method by which a blockchain network reaches distributed consensus about which node is allowed to create the next block of the blockchain. PoS-methods may use a weighted random selection, whereby the weights of the individual nodes may be determined in particular in dependence on the assets (the "stake") of the respective node.

According to embodiments of asynchronous BFT consensus protocols it is assumed that less than ⅓ (a third) of the nodes in each subnet are corrupt so that artifacts generated and signed by the subnet can be fully trusted.

FIG. 4 illustrates in a more detailed way computational units 15 running on nodes 10 of the network 300. More particularly, FIG. 2 shows on the left side 401 a node 10 of the subset SNA of FIG. 1 on which five computational units 15 are run, more particularly the set of computational units $CU_{A1}$, $CU_{A2}$, $CU_{A3}$, $CU_{A4}$ and $CU_{A5}$. The set of computational units $CU_{A1}$, $CU_{A2}$, $CU_{A3}$, $CU_{A4}$ and $CU_{A5}$ runs on each node 10 of the subnet SNA. Furthermore, the set of computational units $CU_{A1}$, $CU_{A2}$, $CU_{A3}$, $CU_{A4}$ and $CU_{A5}$ is replicated across the whole subnet SNA such that each of the computational units $CU_{A1}$, $CU_{A2}$, $CU_{A3}$, $CU_{A4}$ and $CU_{A5}$ has the same unit state. This may be implemented in particular by performing an active replication in space of the unit state of the computational units $CU_{A1}$, $CU_{A2}$, $CU_{A3}$, $CU_{A4}$ and $CU_{A5}$ on each of the nodes 10 of the subnet SNA.

Furthermore, FIG. 4 shows on the right side 402 a node 10 of the subnet SNB of FIG. 1 on which four computational units 15 are run, more particularly the set of computational units $CU_{B1}$, $CU_{B2}$, $CU_{B3}$ and $CU_{B4}$. The set of computational units $CU_{B1}$, $CU_{B2}$, $CU_{B3}$ and $CU_{B4}$ runs on each node 10 of the subnet SNB. Furthermore, the set of computational units $CU_{B1}$, $CU_{B2}$, $CU_{B3}$ and $CU_{B4}$ is replicated across the whole subnet SNB such that each of the computational units $CU_{B1}$, $CU_{B2}$, $CU_{B3}$ and $CU_{B4}$ has the same unit state, e.g. by performing an active replication in space of the unit state as mentioned above.

Referring back to FIG. 3, the network 300 is configured to exchange inter-subnet messages 16 between the subnets SNA, SNB, SNC and SND via a messaging protocol and a consensus protocol. The consensus protocol is configured to reach a consensus on the processing order of the inter-subnet messages 16 at the respective receiving subnet. Referring e.g. to the subnet SNB, it receives inter-subnet messages 16 from the subnets SNA, SNC and SND. The consensus protocol receives and processes these inter-subnet messages 16 and performs a predefined consensus algorithm or consensus mechanism to reach a consensus on the processing order of the received inter-subnet messages 16.

According to embodiments, the network 300 may be configured to run the consensus protocol separately on each subnet. In other words, each of the subnets SNA, SNB, SNC and SND run its own consensus protocol separately and independently from the other subnets. Accordingly, each of the subnets SNA, SNB, SNC and SND can decide, to a predefined extent, on its own and independently from the other subnets which received messages to process and in which order. Hence each of the subnets SNA, SNB, SNC and SND reaches a consensus on a per-subnet basis on the processing order of the received inter-subnet messages 16. Such a consensus may also be considered as a local consensus or a subnet-consensus.

This concept is illustrated in more detail with reference to FIG. 5.

Figure 5:
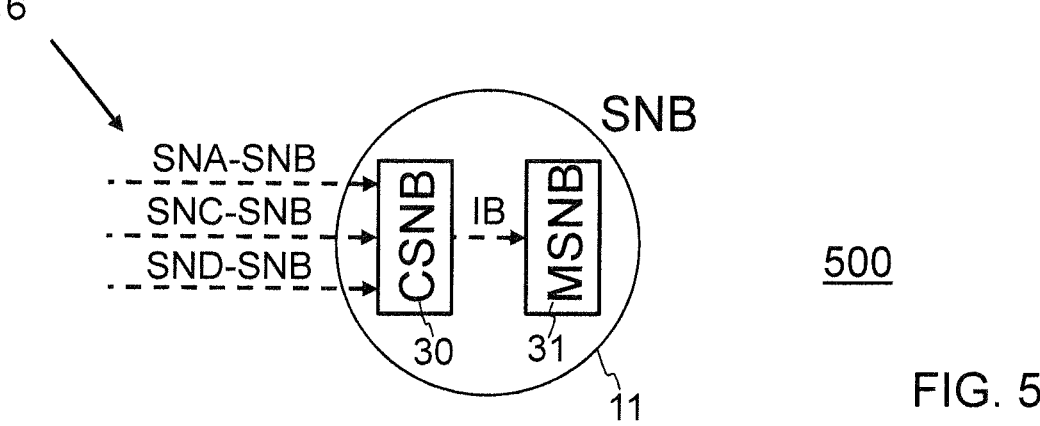
FIG. 5 shows a schematic illustration of inter-subnet messages which are received at a subnet of the network of FIG. 3.

FIG. 5 shows a schematic illustration of inter-subnet messages 16 which are received at the subnet 11, SNB of FIG. 3

The subnet SNB receives inter-subnet messages SNA-SNB from the subnet SNA, inter-subnet messages SNC-SNB from the subnet SNC and inter-subnet messages SND-SNB from the subnet SND. These pool of inter-subnet messages is processed by a consensus component 30, CSNB which runs locally a consensus protocol on the subnet SNB. Hence the consensus component 30 may be denoted as subnet consensus component.

The consensus component 30 generates a queue of input blocks IB from the inter-subnet messages according to a predefined consensus algorithm or mechanism and provides the queue of input blocks IB to a messaging component 31, MSNB which is configured to run a messaging protocol and to further process the input blocks IB.

According to embodiments each of the nodes 10 of a respective subnet 11 may participate in the consensus protocol. According to such embodiments, each of the subnets 11 may comprise e.g. 10 to 100 nodes, in particular 20 to 50 nodes. Such numbers may provide an advantageous compromise between security and efficiency.

According to other embodiments, the consensus protocol may be configured to elect members of a committee from the plurality of nodes 10 of the respective subnet 11 according to a predefined election scheme and to perform the consensus protocol only with the elected members of the committee. Such an approach is in particular useful for subnets with a larger number of nodes, e.g. for subnets with 1000 or more nodes.

Figure 6:
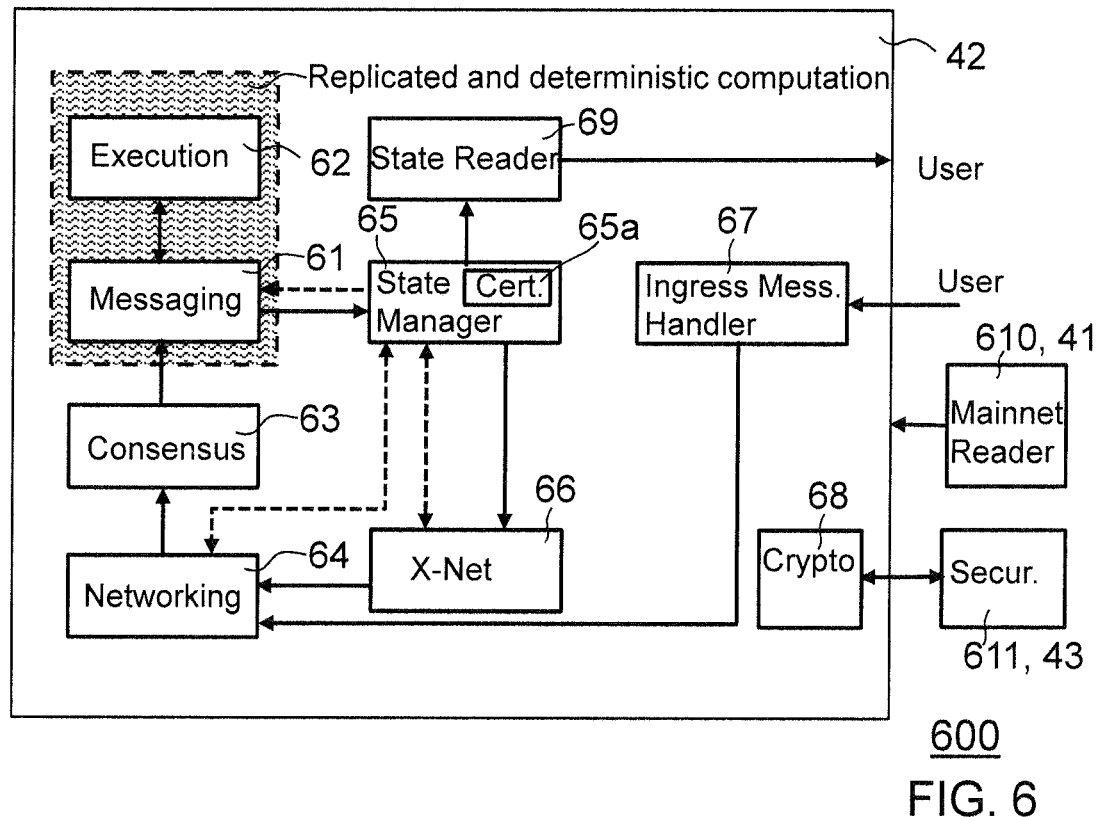
FIG. 6 shows a schematic block diagram of protocol components of a subnet protocol client.
Figure 16:
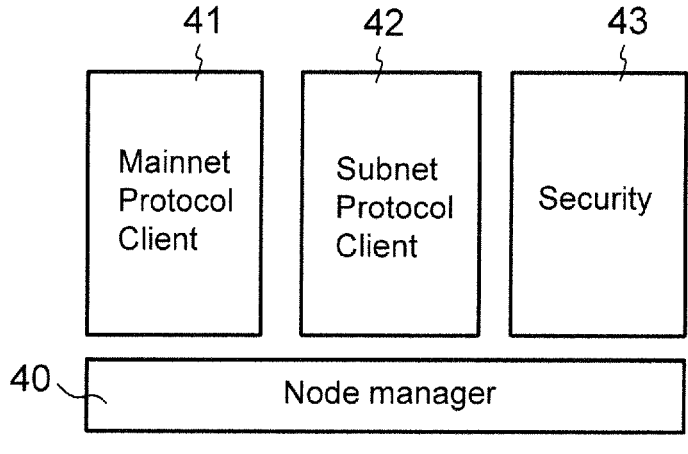
FIG. 16 illustrates main processes which are run on each node of the network according to an embodiment of the invention.

FIG. 6 shows a schematic block diagram of protocol components 600 of a subnet protocol client, e.g. of the subnet protocol client 42 as shown in FIG. 16.

Full arrows in FIG. 6 are related to execution messages which comprises unit-to-unit messages and ingress messages. Ingress messages may be in particular mutating-queries from a user. Dashed arrows relate to system information.

The protocol components 600 comprise a messaging component 61 which is configured to run the messaging protocol and an execution component 62 configured to run an execution protocol for executing execution messages, in particular for executing unit-to-unit messages and/or mutating queries. The protocol components 600 further comprise a consensus component 63 configured to run a consensus protocol, a networking component 64 configured to run a networking protocol, a state manager component 65 configured to run a state manager protocol, an X-Net component 66 configured to run a cross-subnet transfer protocol and an ingress message handler component 67 configured to handle ingress messages received from an external user of the network. The protocol components 600 comprise in addition a crypto component 68. The crypto component 68 co-operates with a security component 611, which may be e.g. embodied as the security application 43 as will be described subsequently with reference to FIG. 16. The protocol components 600 further comprise a state reader component 69 which is configured to receive read queries or in other word read requests from a user.

The state reader component 69 is configured to cooperate with the state manager component 65.

The read queries which are received and handled by the state reader component 69 are in particular embodied as non-mutating queries, i.e. they do not change persistently the unit state of the computational units. On the other hand, the ingress messages which are received from the ingress message handler component 67 and go through the consensus component 63, may be in particular embodied as mutating queries, i.e. they change the unit state of the respective computational unit that is executing the mutating query. As the read queries do not have to go through the consensus component 63, they can be made asynchronously on any node of the respective subnet and can hence be much faster.

Furthermore, the subnet-protocol client 42 may cooperate with a reader component 610, which may be a part of the mainnet protocol client 41 as described with reference to FIG. 16. The mainnet reader component 610 may provide information that is stored and distributed by the mainnet to the respective subnet protocol client 42. This includes the assignment of nodes to subnets, node public keys, assignment of computational units to subnets etc.

The messaging component 61 and the execution component 62 are configured such that all computation, data and state in these components is identically replicated across all nodes of the respective subnet, more particularly all honest nodes of the respective subnet. This is indicated by the wave-pattern background of these components.

Such an identical replication is achieved according to embodiments on the one hand by virtue of the consensus component 63 that ensures that the stream of inputs to the messaging component 61 is agreed upon by the respective subnet and thus identical for all nodes, more particularly by all honest nodes. On the other hand, this is achieved by the fact that the messaging component 61 and the execution component 62 are configured to perform a deterministic and replicated computation.

The X-Net Transfer component 66 sends message streams to other subnets and receives message streams from other subnets.

Most components will access the crypto component 68 to execute cryptographic algorithms and the mainnet reader 610 for reading configuration information.

The execution component 62 receives from the messaging component 61 a unit state of the computational unit and an incoming message for the computational unit, and returns an outgoing message and the updated unit state of the computational unit. While performing the execution, it may also measure a gas or fuel consumption of the processed message (query).

The messaging component 61 is clocked by the input blocks received from the consensus component 63. That is, for each input block, the messaging component 61 performs steps as follows. It parses the respective input blocks to obtain the messages for its computational units. Furthermore, it routes the messages to the respective input queues of the different computational units and schedules, by a scheduler, messages to be executed according to the capacity each computational unit got assigned. Then it uses the execution component 62 to process a message by the corresponding computational unit, resulting in messages to be sent being added to an output queue of the respective computational unit. However, when the message is destined to a computational unit on the same subnet it may be put directly in the input queue of the corresponding computational unit. The messaging component 61 finally routes the messages of the output queues of the computational units into message streams for subnets on which the receiving computational units are located and forwards these message streams to the state manager component 65 to be certified, i.e., signed by the respective subnet.

The state manager component 65 comprises a certification component 65a. The certification component 65a is configured to certify the output streams of the respective subnet. This may be performed e.g. by a group signature of the computational units of the respective subnet.

The certification component 65a may be further configured to certify certain variables of the unit state, in particular certain variables of snapshots of the unit state as will be described below in more detail.

Figure 7:
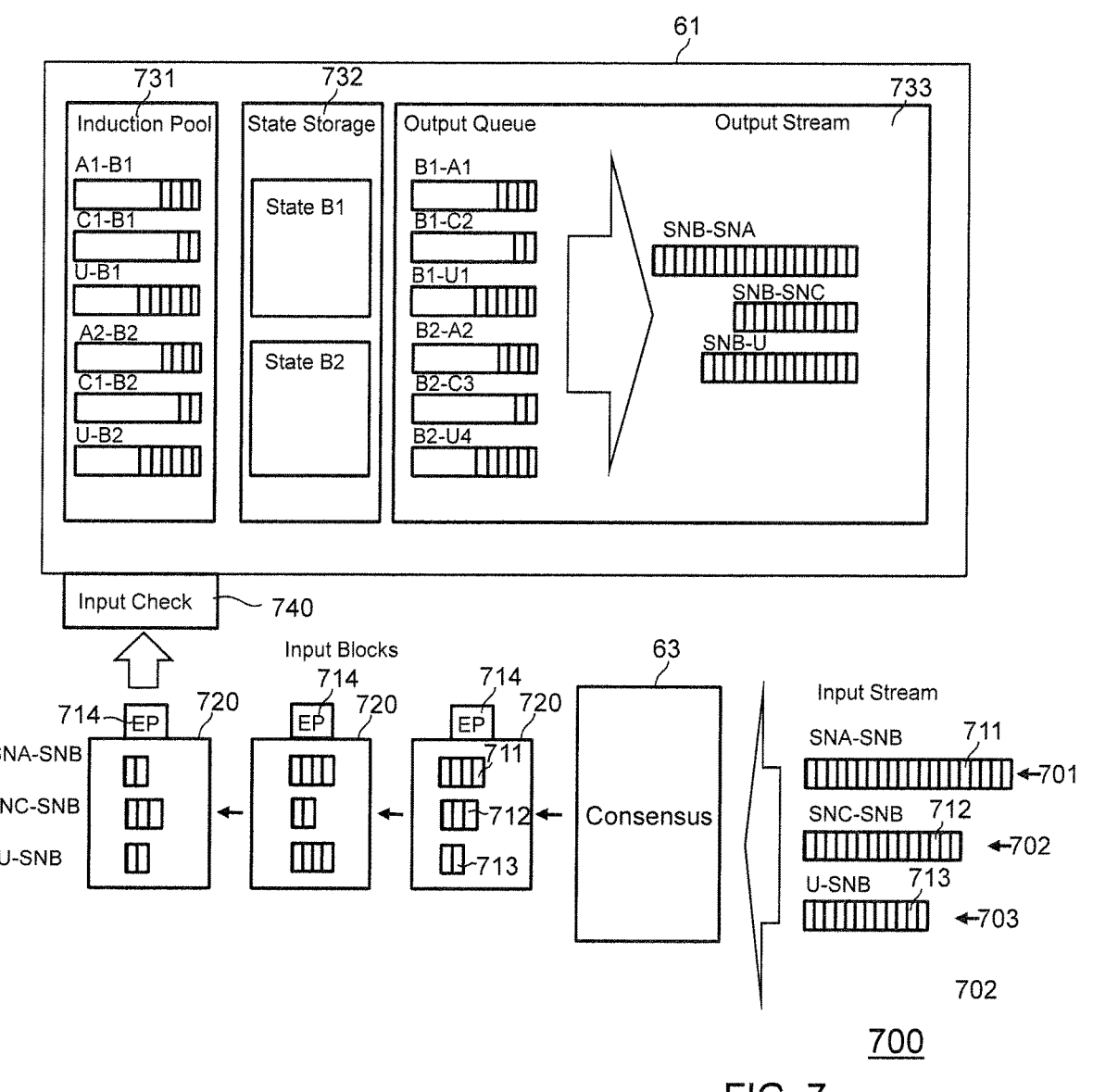
FIG. 7 shows an exemplary visualization of a workflow of the messaging protocol and the consensus protocol and the associated components.

FIG. 7 shows an exemplary visualization of a workflow 700 of the messaging protocol and the consensus protocol and the associated components, e.g. of the messaging component 61 and the consensus component 63 of FIG. 6. More particularly, FIG. 7 visualizes the workflow of inter-subnet messages exchanged between a subnet SNB and subnets SNA and SNC. Furthermore, the subnet SNB exchanges ingress messages with a plurality of users U.

Starting from the bottom right of FIG. 7, a plurality of input streams 701, 702 and 703 is received by a consensus component 63. The consensus component 63 is a subnet consensus component that is run by a subnet client of the subnet SNB. The input stream 701 comprises inter-subnet messages 711 from the subnet SNA to the Subnet SNB. The input stream 702 comprises inter-subnet messages 712 from the subnet SNC to the Subnet SNB. The input stream 703 comprises ingress messages 713 from the plurality of users U to the subnet SNB.

The inter-subnet messages 711 and 712 comprise unit-to-unit messages to be exchanged between the computational units of the different subnets as well as signalling messages. The signalling messages are used to acknowledge or not acknowledge a receipt of unit-to-unit messages. The messaging component 61 is configured to send the signalling messages from a receiving subnet to a corresponding sending subnet, i.e. in this example from the subnet SNB to the subnets SNA and SNC. The messaging component 61 is according to this example configured to store the sent unit-to-unit messages until an acknowledgement message has been received for the respective unit-to-unit message. This provides a guaranteed delivery.

The consensus component 63 is configured to receive and process the inter-subnet messages 711, 712 of the subnets SNA, SNC and the ingress messages 713 of the users U and to generate a queue of input blocks 720 from the inter-subnet messages 711, 712 and the ingress messages 713 according to a predefined consensus mechanism that is executed by the corresponding consensus protocol. Each input block 720 produced by consensus contains a set of ingress messages 713, a set of inter-subnet messages 711, 712 and execution parameters 714, EP. The execution parameters 714, EP may include in particular a random seed, a designated execution time and/or a height index. The consensus component 63 may also vary the number of messages in every input block based on the current load of the subnet.

The consensus component 63 provides the queue of input blocks 720 then to the messaging component 61 which is configured to execute the messaging protocol and to process the input blocks 720.

The messaging protocol and the messaging component 61 are clocked by the input blocks 720 received from the consensus component 63.

Before processing the received input blocks, the messaging component 61 may perform one or more pre-processing steps including one or more input checks. The input checks may be performed by an input check component 740.

The input checks may be performed with different granularity according to embodiments. At first, the input checks may be performed for the whole input block. Such checks may also be denoted as input block checks. These may comprise a check of the height of the next input block. If the height of the next input block is lower than expected next in sequence, then it is discarded. If the input block is not the expected next in sequence, then the messaging component 61 may trigger a node catch up protocol. If the input block is the next in sequence, then it is further processed by the messaging component 61.

The different types of messages (signalling messages, ingress messages, unit-to-unit messages) in the input blocks may be grouped together.

The input checks may further comprise an overload check to check whether the messaging component is currently overloaded and does not have enough capacity to perform the processing. If e.g. the relevant queue in the induction pool is full, the corresponding message may be rejected. Further input checks may comprise an in-order delivery check. To satisfy the in-order delivery requirement, messages can be annotated e.g. with sequence numbers. If a message with a sequence number is received, the messaging component 61 may check whether it has the expected number, and if not, may reject it. Furthermore, the input check component 740 may perform a validity check of the target destination, i.e. whether a message targets a computational unit that is active on the corresponding subnet.

If the input checks have been passed successfully, the messages of the respective input block 720 may be further processed by the messaging component 61 and the corresponding messages may be appended to a corresponding queue in an induction pool of an induction pool component 731. The induction pool component 731 of the messaging component 61 receives input blocks and input messages that have been successfully passed the input check component 740 and have accordingly been accepted by the messaging component 61 for further processing.

In general, the messaging component 61 preprocesses the input blocks 720 by placing ingress messages, signalling messages and inter-subnet messages into the induction pool component 731 as appropriate. Signalling messages in the incoming subnet streams are treated as acknowledgements of messages of the output queues which can then be purged.

In this example, the induction pool component 731 comprises unit-to-unit queues A1-B1, C1-B1, A2-B2 and C1-B2 as well as user-to-unit queues U-B1 and U-B2.

Following these pre-processing steps, the messaging component 61 invokes the execution component 62 (see FIG. 6) to execute as much of the induction pool as is feasible during a single execution cycle, providing the designated execution time and the random seed as additional inputs. Following the execution cycle, a resulting output queue of messages is fed to an output queue component 733. Initially the output queue component 733 comprises unit-to-unit and unit-to-user output queues, in this example the unit-to-unit output queues B1-A1, B1-C2, B2-A2 and B2-C3 and the unit-to-user output queues B1-U1 and B2-U4. As an example, the messages B1-A1 denote messages from the computational unit B1 of subnet SNB to the computational unit A1 of subnet SNA. As another example, the messages B1-U1 denote messages from the computational unit B1 of subnet SNB to the user U1.

The output queue component 733 post-processes the resulting output queue of the messages by forming a set of per-subnet output streams to be certified, e.g. by the certification component 65a as shown in FIG. 6, and disseminated by other components. In this example, the per-subnet output streams SNB-SNA, SNB-SNC and SNB-U are provided.

The messaging component 61 further comprises a state storage component 732 that is configured to store the state/unit state of the computational units of the respective subnet, in this example the states of the computational units B1 and B2 of the subnet SNB. The corresponding unit state is the working memory of each computational unit.

The messaging component 61 revolves around mutating certain pieces of system state deterministically. In each round, the execution component 61 will execute certain messages from the induction pool by reading and updating the state of the respective computational unit and return any outgoing messages the executed computational unit wants to send. These messages go into the output queue component 733, which initially contains unit-to-user messages and unit-to-unit messages between computational units of the network. While intra-subnet messages between computational units of the same subnet may be routed and distributed internally within the respective subnet, inter-subnet messages are routed into output streams sorted by subnet-destinations.

In addition, two pieces of state may be maintained according to embodiments to inform the rest of the system about which messages have been processed. A first piece may be maintained for inter-subnet messages and a second piece of state for ingress messages.

Figures 8, 9:
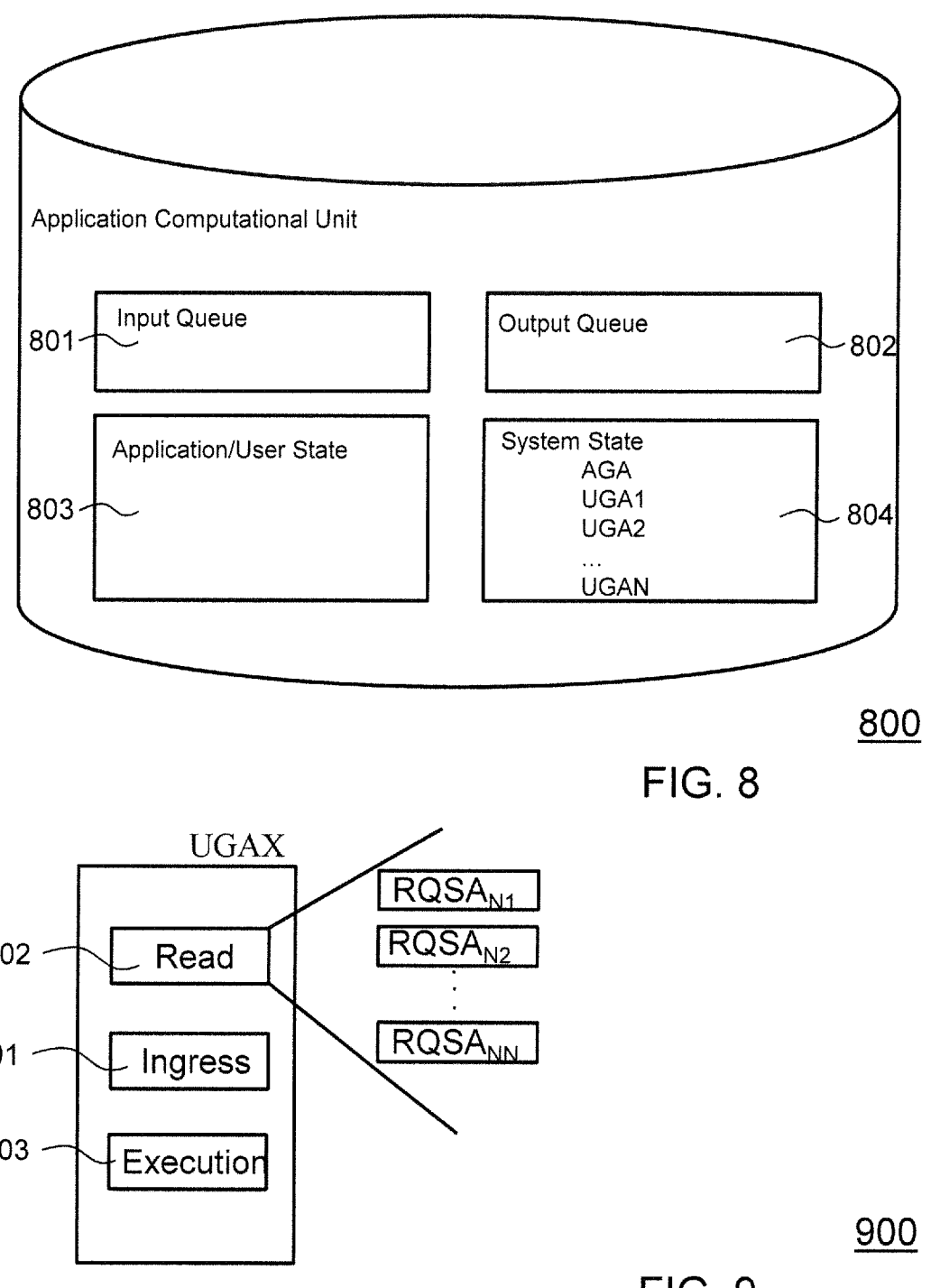
FIG. 8 shows a more detailed illustration of an application unit according to an embodiment of the invention.
FIG. 9 shows a more detailed illustration of an exemplary local user gas account according to an embodiment of the invention.

FIG. 8 shows an exemplary application (computational) unit 800 according to an embodiment of the invention.

The application unit 800 comprises an input queue 801, an output queue 602, a user or application state 803 and a system state 804.

All input queues 801 of the application units (on a given subnet) collectively make up the induction pool, but the input queues are part of the state of the application computational unit. The output queues 802 contain messages that need to be delivered to other application computational units, possibly on other subnetworks.

The application state 803 comprises a main Web Assembly (Wasm) module which implements the functionality of the application computational unit and its dependent modules, together with an instance of each of the modules. A Wasm module instance consists of memories, global variables and tables.

The system state 804 cannot be freely modified by code of the application computational unit. It includes meta-data, other state maintained by system on behalf of the application computational units, notably the compiled form of the Wasm modules, and context and callbacks for outstanding messages.

In addition, the system state 804 comprises an application unit gas account for the respective application computational unit 800 as well as one or more local user gas accounts, which are denoted in this example with UGA1, UGA2, . . . , UGAN. The user gas accounts comprise the current gas balance of the respective users U1, U2, . . . , UN at the application computational unit 800.

FIG. 9 shows a more detailed illustration of an exemplary local user gas account UGAX according to an embodiment of the invention.

The local user gas account UGAX comprises an ingress sub-account 901, a read query sub-account 902 and an execution sub-account 903. The ingress sub-account 901 is configured to pay for ingress messages that have been accepted or rejected for further processing, in particular for ingress messages that have been placed in the induction pool 731 as described above with reference to FIG. 7. Furthermore, if an ingress message makes it all the way through consensus, but does not pass the input check 740, it has already used network resources. Hence according to embodiments the user also needs to pay for rejected ingress messages.

The read query sub-account 902 is configured to pay for read queries. Such read queries may be sent by a user of the network to one or more of the nodes of a respective subnet. According to embodiments the nodes make regularly read snapshot of the unit states of the application units of a respective subnet and a user may access the read snapshots by means of the read queries. Each of the nodes of a respective subnet have a separate read query sub-account $RQSA_{N1}$, $RQSA_{N2}$, $RQSA_{NN}$ for charging its read queries.

The execution sub-account 903 is configured to pay for the execution of messages, in particular the execution of ingress messages. Furthermore, it may be configured to pay for the execution of unit-to-unit messages according to embodiments.

According to embodiments each of the respective sub-accounts needs to have a sufficient balance. Otherwise the corresponding request/execution will not be performed. As an example, if the ingress-sub-account 901 does not have a sufficient balance, a corresponding ingress message will not be accepted.

Figure 10:
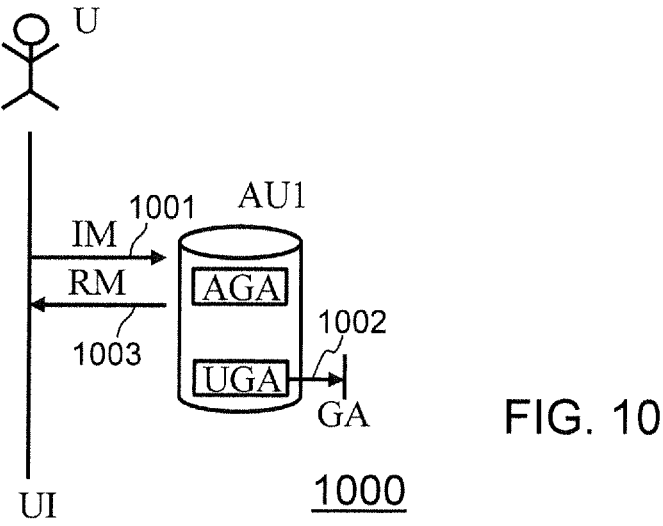
FIG. 10 illustrates a charging/payment scheme according to an embodiment of the invention.

FIG. 10 illustrates a charging/payment scheme according to an embodiment of the invention. In the example of FIG.

10 it is assumed that only a single exemplary application unit AU1 of a distributed network 1000 is involved in an exemplary transaction and the associated charging/payment. The application unit AU1 comprises an application unit gas account. AGA which is owned by the application unit AU1 and which is used by the application unit AU1 to pay for the use of network resources as well as to receive payments.

The application unit AU1 further comprises a local user gas account UGA for a user U of the distributed network. The local user gas account UGA is configured to process the resource payments of the network resources which are caused by a request of the user U.

In the illustrated example of FIG. 10 it is assumed that a user U is connected to the distributed network via a user interface UI.

At a step 1001, the user U sends an ingress message IM to the application unit AU1. The ingress message IM is embodied as message which requests a primary application service. The application unit AU1 serves as primary application unit and establishes the entry point of the distributed network 1000 for the ingress message. The primary application unit AU1 performs the primary application service requested by the user. The primary application service may be generally any kind of service, e.g. providing an access to a website, booking a trip, providing a postcard application etc. In the example of FIG. 10 it is assumed that the primary application unit AU1 can handle the ingress message IM independently without the need to involve other (not shown) application units of the distributed network 1000.

At a step 1002, the application unit AU1 processes the charge or payment for the use of the network resources caused or used by the primary application service. More particularly, a respective gas amount GA is deducted from the local user gas account UGA. According to some embodiments, the gas amount GA may be just "burned", i.e. it is removed or eliminated from the system without a transfer to another account, or it may be transferred to a system account of the distributed network. According to other embodiments, the gas amount may be transferred to the application unit gas account AGA.

Furthermore, at a step 1003, the application unit AU1 returns a response message RM to the ingress message IM via the user interface UI to the user U. The response message RM may be e.g. a requested webpage and may also be considered as a result that is provided to the user in response to the ingress message.

Figure 11:
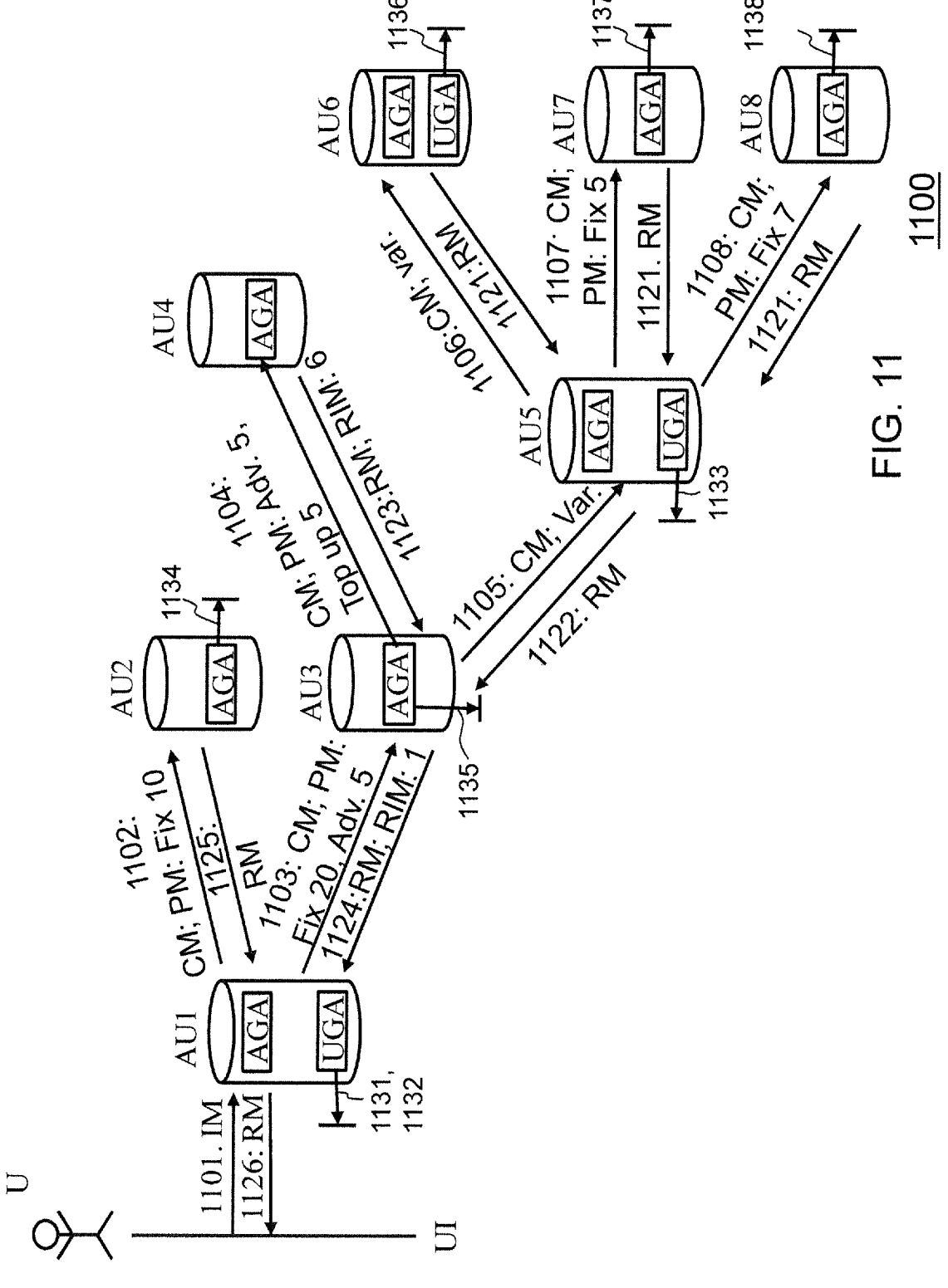
FIG. 11 illustrates another charging/payment scheme according to an embodiment of the invention.

FIG. 11 illustrates a charging/payment scheme with reference to a distributed network 1100. FIG. 11 shows 8 exemplary application units of the distributed network 1100 which are involved in an exemplary transaction and the associated charging/payment for the use of network resources involved in the transaction. More particularly, FIG. 11 shows the application units AU1, AU2, AU3, AU4, AU5, AU6, AU7 and AU8. Each of the application units AU1, AU2, AU3, AU4, AU5, AU6, AU7 and AU8 comprise an application unit gas account AGA. The application unit gas accounts AGA are gas accounts which are owned by the corresponding application units AU1, AU2, AU3, AU4, AU5, AU6, AU7 and AU8 and which are used by the respective application units to pay for the use of resources of the distributed network 1100 as well as to receive payments.

According to embodiments the distributed network 1100 also charges for the use of storage resources it provides. The respective application unit gas accounts AGA may hence be used to pay for the use of the storage resources of the network by the respective application unit. These storage costs may be charged e.g. periodically, e.g. by a high-water mark billing scheme. According to such a scheme the respective application unit will be charged for the maximum amount of storage space which it has used in a predefined period of time.

In addition to the application unit gas accounts AGA, the application units $AU_X$ may comprise local user gas accounts UGA for the users of the distributed network. These local user gas accounts UGA are configured to process the payments for the use of network resources of the corresponding users of the distributed network 1100.

According to embodiments, a user needs to have a user gas account UGA at each primary application unit to which he wants to send an ingress message for requesting a primary application service.

In the illustrated example of FIG. 11 it is assumed that a user U is connected to the distributed network via a user interface UI.

According to embodiments, the user U is informed beforehand, e.g. by a browser plugin, on which further application units AU, in the following denoted as secondary application units, she needs to have a user gas account for requesting a respective primary application service. This may differ in dependence on the respective primary application service. According to some embodiments, no further user gas accounts at secondary application units may be needed, while for some primary application services a separate user gas account at each of the secondary applications units involved in the respective primary application service may be required. Such a browser plugin may also regularly check whether the respective user gas accounts are sufficiently charged. Otherwise, the user's ingress message may be rejected.

According to embodiments, application units may be written in a way that takes care of out of gas situations such that one does not have to start from scratch and such that the user is informed when the call tree/execution tree of a respective request hits an application unit for which the user needs to have a local user gas account, but the local user gas account does no longer have a sufficient balance. According to embodiments, the user interface UI may then also provide the possibility to arrange a refill of the respective user gas account from the wallet computational unit of the user.

In this example the user U needs to have and actually has a local user gas account UGA at the application unit AU1 and at the application unit AU5.

An exemplary process flow of a charging scheme may operate as follows.

At a step 1101, the user U sends an ingress message IM to the application unit AU1. The ingress message IM is embodied as a message which requests a primary application service. The application unit AU1 serves as primary application unit and establishes the entry point of the distributed network for the ingress message IM. The primary application unit AU1 performs the primary application service request by the user. The primary application service may be generally any kind of service, e.g. providing an access to a website, booking a trip, providing a postcard application etc.

According to this example, the requested primary application service cannot be performed solely by the primary application unit AU1, but requires the involvement of a plurality of further application units, more particularly the involvement of the application units AU2, AU3, AU4, AU5, AU6, AU7 and AU8. The further application units will in the following be denoted as secondary application units.

The involvement of the secondary application units AU2, AU3, AU4, AU5, AU6, AU7 and AU8 is triggered or performed by issuing, at steps 1102 and 1103, by the primary application unit AU1 calls to one or more secondary application units, in this example to the application units AU2 and AU3. The calls may encompass the sending of a call message CM. The call message CM, which may be considered as an embodiment of a unit-to-unit message, may include a payment message PM.

According to other embodiments the payment message PM may also be sent separately. The call messages to the secondary application units comprise a request to perform secondary application services by the secondary application units.

In this example the secondary application unit AU3 issues further calls to further secondary application units. More particularly, the secondary application unit AU3 issues, at a step 1104, a call to the secondary application unit AU4 and, at a step 1105, a call to the secondary application unit AU5.

And the secondary application unit AU5 issues, at steps 1106, 1107 and 1108, call messages CM to the secondary application units AU6, AU7 and AU8 respectively. These call messages establish a multi-call.

The entire calls or call messages CM that are triggered by the ingress message IM may be denoted as call tree. More particularly, the call or call messages issued at the steps 1102-1108 including the initial ingress message issued at step 1101 may be considered as call tree.

As mentioned above, the secondary application unit AU5 comprises also a local user gas account UGA. This local user gas account UGA of the secondary application unit AU5 can be used to process charges or payments for the use of the network resources which are needed by the secondary application unit AU5 for performing its secondary application services. These payments may include payments for the secondary services of the secondary application units AU6, AU7 and/or AU8 which are requested by the corresponding multi-call.

The call tree of this example illustrates different payment schemes of the various application units which are involved in the call.

More particularly, the application unit AU2 charges a fixed price of e.g. 10 gas units and the application unit AU3 charges a fixed price of e.g. 20 gas units for the performance of its secondary application services.

The respective amount of gas is transferred between the application units by sending, at the step 1102, a payment message PM comprising a fixed payment of 10 gas units from the application unit AU1 to the application unit AU2 and by sending, at the step 1103, a payment message PM comprising a fixed payment of 20 gas units from the application unit AU1 to the application unit AU3. More particularly, these payment messages PM perform a transfer of a currency amount, in particular an amount of gas units, from the application unit gas account AGA of the application unit AU1 to the application unit gas accounts AGA of the application units AU2 and AU3.

The application unit AU4 charges an advance payment for the use of the network resources to perform its secondary application service. The advance payment may be considered as a minimal amount of gas which need to be put on messages. The specified amount of the advance payment may be in particular chosen such that it will be almost all the time sufficient to get the execution of the corresponding primary or secondary application service done, e.g. with a probability of 99%. In order to even further increase this probability, primary or secondary application units may use their own application unit gas account AGA to top up the respective advance payment to ensure execution of the corresponding primary and/or secondary application service with an even higher probability, e.g. with a probability of 99.999%. In this example it is assumed that the application unit AU3 tops up the advance payment of 5 gas units as specified by the application unit AU4 by another 5 gas units from its own application unit gas account so that in total 10 gas units are available for the application unit AU4 for paying the network resources which are needed for the execution of its secondary application service.

The respective amount of gas of e.g. 10 gas units is transferred from the application unit AU3 to the application unit AU4 by sending, at the step 1104, a payment message PM comprising an advance payment of 5 gas units and a top up payment of 5 gas units from the application unit AU3 to the application unit AU4. Furthermore, according to this example, the payment message PM which is sent at the step 1103 would also comprise the advance payment of 5 gas units which would be transferred from the application unit gas account of the application unit AU1 to the application unit gas account of the application unit AU3.

As opposed to the payment messages PM sent at steps 1102, 1103, 1106, 1107 and 1108, the amount of 10 gas transferred to application unit AU4 by the payment message PM at step 1104 may be not credited according to embodiments to the application user gas account of the receiving application unit. However, the amount may be used to directly pay for the actual use of the network resource, to which end it may e.g. be "burned", i.e. removed or eliminated from the system. Assuming e.g. that the secondary application unit AU4 in the actual case needs only 4 gas units for its secondary application service, 6 gas units may be reimbursed.

The reimbursement may be performed by sending from the application unit AU4 a reimbursement message RIM comprising a reimbursement of 6 gas units to the application unit AU3. The reimbursement message RIM may be sent at a step 1123 together with a response message RM or it may also be embodied as separate message.

The application unit AU3 may then keep 5 gas units, more particularly the amount of 5 gas units it has topped up from its own AGA, and transfer it back to its own AGA. Furthermore, the application unit AU3 may reimburse the remaining unused part of the advance payment (1 gas unit in this example) back to the application unit AU1, e.g. by sending, at a step 1124, a reimbursement message RIM (again e.g. as part of a response message or separately) to the application unit AU1. The application unit AU1 may then reimburse this 1 gas unit to the local user gas account UGA of the user U.

The call embodied as call message CM which is issued, at step 1105, to the secondary application unit AU5, involves a variable payment. More particularly, the application unit AU5 has not specified a fixed price for the secondary services, but a variable price that it will charge directly from the user gas account UGA run by the user at the application unit AU5.

According to this example, the call message CM which is issued at step 1106 also involves a variable charge or payment. Accordingly, the application unit AU6 comprises also a local user gas account UGA and charges a variable price directly from its user gas account UGA, e.g. at step 1136.

On the other hand, the secondary application units AU7 and AU8 charge a fixed price. More particularly, the application unit AU7 charges a fixed price of 5 gas units and the application unit AU8 charges a fixed price of 7 gas units. The respective amount of gas is transferred from the application unit AU5 to the application units AU7 and AU8 by sending, e.g. at the steps 1107 and 1108 corresponding payment messages PM from the application unit AU5 to the application units AU7 and AU8. According to other embodiments, the payment messages PM may be send at separate steps.

In response to the multi-call that has been issued to the application units AU6, AU7 and AU8, the application unit AU5 receives, at commonly denoted steps 1121, response messages RM from the application units AU6, AU7 and AU8.

After having executed the respective secondary application services, the secondary application unit AU5 sends, at a step 1122, a response message RM to the application unit AU3. Furthermore, the secondary application unit AU4 sends, at a step 1123, a response message RM to the application unit AU3. This may include a reimbursement message RIM of e.g. 6 gas units as explained above. Then the secondary application unit AU3 sends, at a step 1124, a response message RM to the primary application unit AU1. This may include e.g. a reimbursement message RIM of e.g. 1 gas unit. The secondary application unit AU2 sends, at a step 1125, a response message RM to the primary application unit AU1. And the primary application unit AU1 provides, at a step 1126, a response message RM to the user U via the user interface UI.

According to embodiments, the distributed network is configured to charge separately for the ingress messages, in particular the acceptance of the ingress message for execution, and the execution of messages. In this respect different accounting periods may be implemented for the ingress messages and the execution of the ingress messages. As an example, if the distributed network is embodied as described with reference to FIG. 7, the ingress messages may be charged once they have successfully passed the input check 740 and have entered the induction pool 731. Furthermore, the execution of the ingress messages may be charged already according to embodiments after the primary application unit has performed some initial processing. According to embodiments the execution of the ingress messages may be charged after the primary application unit has issued the one or more calls to the secondary application units which are required to execute the respective ingress message.

Referring to the example as presented above, the primary application unit AU1 may charge, at a step 1131, for the acceptance of the ingress message IM, more particularly once it has entered the induction pool. This may be e.g. a fee depending on the size of the IM, and the respective gas units are in particular deducted from the ingress sub-account 901 (see FIG. 9) of the user gas account. Furthermore, it may process at a step 1132 the charge or payment for the use of the network resources caused by the ingress message IM. The respective payment may be deducted from the user gas account UGA of the primary application unit AU1 and may encompass the fixed price of e.g. 10 gas units for the application unit AU2, the fixed price of 20 gas units for the application unit AU3, the advance payment of 5 gas units for the application unit AU4 as well as e.g. a fixed price of 20 gas units for the execution of the primary application service by the application unit AU1. Hence in this example after the issuance of the calls, the primary application unit AU1 may deduct, at the step 1132, 55 gas units from the local user gas account at the primary application unit AU1 for the execution of the ingress message IM. This deduction of the respective gas units is in particular taken from the execution sub-account 903 (see FIG. 9) of the user gas account.

The step 1132 may be e.g. performed immediately before or after the steps 1102-1103.

Hence in the step 1132 the user pays from his execution sub-account for the individual instructions being executed by the primary application unit AU1 as well as for the calls made to other application units which provide no own user account. The charged costs may include the gas sent with the call for the fixed payments as well as the advanced payments. According to embodiments the costs may also include an advance payment for the execution of a closure that handles the eventual response(s)/result/(s). According to embodiments a change (unused amount of gas units) from execution of the closure can be returned to the execution sub-account of the user gas account. According to embodiments a developer may choose not to provide a closure to handle the response/result of a call, in which case she is not billed for it. A closure may be specially configured such that if its execution costs overflow a minimum closure cost then this additional cost is deducted from the execution sub-account.

Further referring to the example as presented above, at a step 1133, the secondary application unit AU5 may process the charge or payment for the use of the network resources by AU7 and AU8 as well as for its own use by deducting the total costs from the user gas account UGA of the application unit AU5. According to other embodiments, the costs may be deducted from the application unit gas account AGA. The step 1133 may be performed immediately before or after sending the call messages CM at the steps 1106, 1107 and 1108.

Similarly, at further steps 1134, 1135, 1137 and 1138, the secondary application units AU2, AU3, AU7 and AU8 may process the charge or payment for their own respective use of the network resources.

According to embodiments, the respective gas that is charged at the steps 1131 to 1138 may be burned.

According to embodiments, the respective payment method for the respective application may be specified in an interface description language (IDL) of the application units and can hence be specified by the respective programmer/developer of the application units. In particular, the interface description of the respective application unit may specify whether users are expected to have a local user gas account with the application unit and what the expected balance should be. In the latter case, if the application unit serves e.g. as secondary application unit, no gas needs to be put on call messages sent to that secondary application unit by other application units, in particularly by primary application units. According to embodiments the user and/or the respective primary application unit is enabled to calculate the call tree. In addition, it may be specified in the IDL that a fixed price is to be paid to execute the function/call, and for which it guarantees execution, provided the application unit gas account of the application unit is not exhausted by it.

According to embodiments, the fixed price will be always charged, irrespective of the actual cost of execution or whether it was successful.

In addition, the interface description may specify that an advance payment is needed for the execution of a respective function/call and that this "minimal" amount of gas (specified as advanced payment) needs to be put on corresponding call messages. According to embodiments this minimal amount of gas may be calculated dynamically by recording the maximum amount of gas ever consumed, and then e.g. multiplying it with a predefined factor, e.g. by 1.5.

Figure 12:
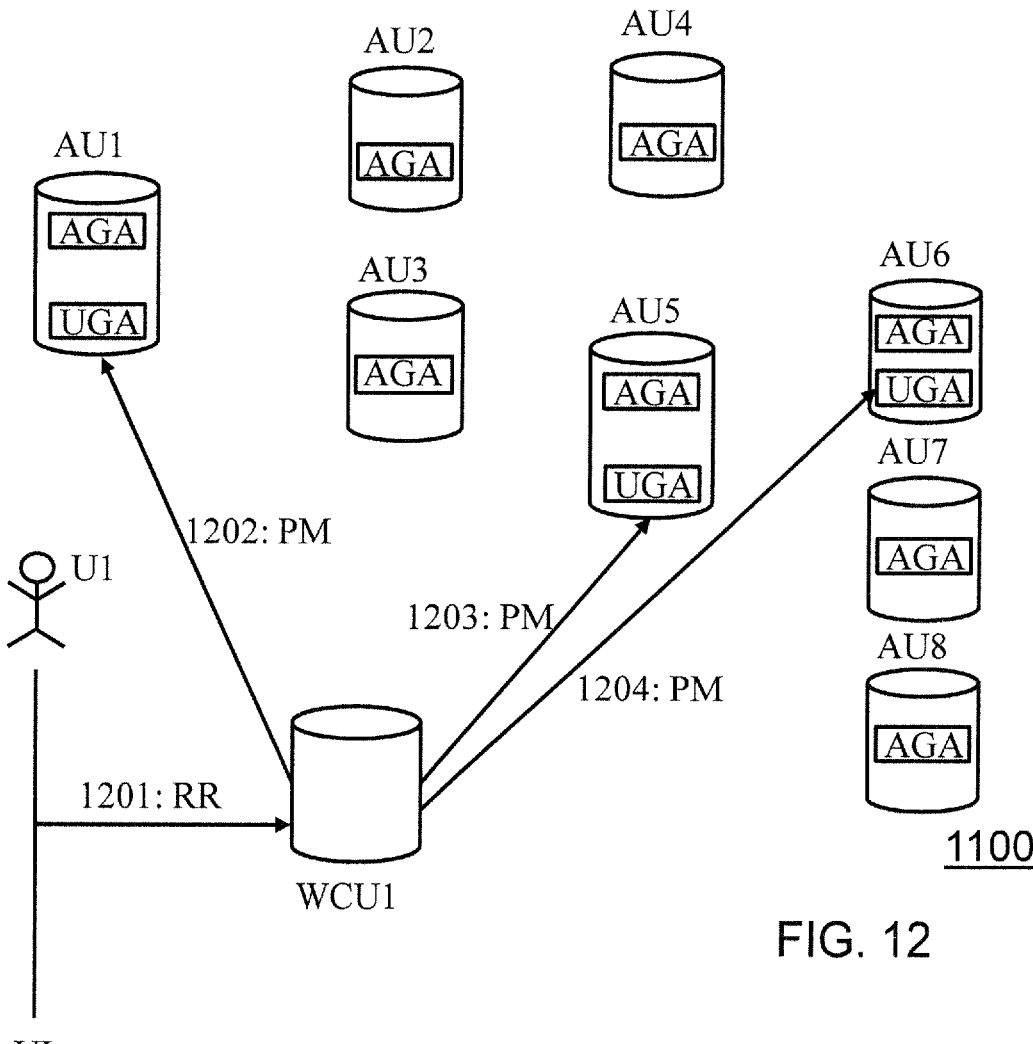
FIG. 12 illustrates how users of a distributed network can recharge their local user gas account.

FIG. 12 illustrates how users of a distributed network can upload their local user gas account. The illustration is provided with reference to the distributed network 1100 comprising the application units AU1, AU2, AU3, AU4, AU5, AU6, AU7 and AU8 as described above.

As shown in FIG. 12, a user U1 runs a wallet computational unit WCU1. The wallet computational unit WCU1 is configured to manage a user currency account for the user U1.

In order to refill the local user gas accounts UGA from the user currency account provided by WCU1, the user U1 sends, at a step 1201, a refill request RR to her wallet computational unit WCU1. Then the wallet computational unit WCU1 sends, at a step 1202, a payment message PM to the application unit AU1, at a step 1203 a payment message PM to the application unit AU5, and, at a step 1204, a payment message PM to the application unit AU6. This allows to transfer a currency amount from the user currency account to the local user gas accounts UGA at the application units AU1, AU5 and AU6.

The user currency account provided by the wallet computational unit WCU1 may be e.g. recharged/refilled by the user from a conventional bank account. In this respect it may provide an interface to external banking applications or external banking accounts. The wallet computational unit WCU1 may be run in gas units or in another currency, e.g. in a crypto-currency, a stablecoin, or in a classical national currency such as in US-dollars or Euros.

An exchange rate between the crypto-currency or the classical national currency and gas units may be managed by the distributed network 1100 according to the respective needs of the application.

It should be noted that the application unit gas accounts AGA may be refilled e.g. by the owner of the respective application unit. For this purpose the owner of the respective application unit may also have a user currency account, which may also be denoted as owner currency account.

Figure 13:
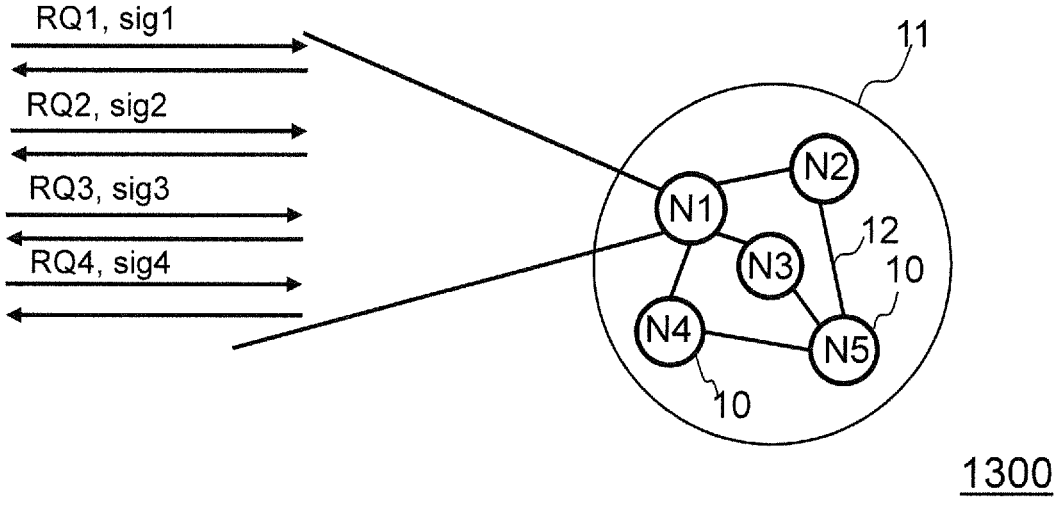
FIG. 13 illustrates a charging scheme for read queries according to an embodiment of the invention.

FIG. 13 illustrates a charging scheme fox read queries according to an embodiment of the invention. A subnet 11 may comprise 5 nodes N1, N2, N3, N4 and N5. Each of the nodes N1, N2, N3, N4 and N5 may run a set of application units having their own unit states. The unit states of the set of application units are replicated across the subnet 11.

The nodes N1, N2, N3, N4 and N5 regularly make a read snapshot of the unit states of the application units of the subnet 11. In order to get access to the read snapshots, a user may send read queries to one or more of the nodes N1, N2, N3, N4 or N5. The read queries are not charged at once, but subsequently in a bundled way.

Furthermore, according to embodiments, each of the nodes N1, N2, N3, N4 and N5 may have a separate read query sub-account RQSA (see also FIG. 9) for charging read queries it has received and processed.

In this example it is assumed that the user sends 4 read queries RQ1, RQ2, RQ3 and RQ4 to the node N1. Furthermore, the user electronically signs each read query. More particularly, the read queries RQ1, RQ2, RQ3 and RQ4 are signed with a signature sig1, sig2, sig3 and sig4 respectively.

Afterwards the user is charged for the 4 read queries subsequently in a bundled way. For this node N1 may send the aggregated amount of gas units to be charged for the bundle of read queries RQ1, RQ2, RQ3 and RQ4, together with an aggregated signature, as system ingress message to the other nodes N2, N3, N4 or N5 of the subnet 11.

Then the aggregated amount of gas units is deducted collectively from the read sub-account 902 of the respective user (see FIG. 9).

As shown in FIG. 9, each of the nodes N1, N2, N3, N4 and N5 may have a separate read query sub-account $RQSA_{N1}$, $RQSA_{N2}$, $RQSA_{N3}$, $RQSA_{N4}$ and $RQSA_{N5}$ respectively. According to embodiments the node N1 may only execute the read queries RQ1, RG2, RQ3 and RQ4 if its separate read query sub-account $RQSA_{N1}$ has a sufficient balance. This may prevent or hinder attacks on a single node, in this example on the node N1, e.g. by flooding the node N1 with read queries.

Figure 14:
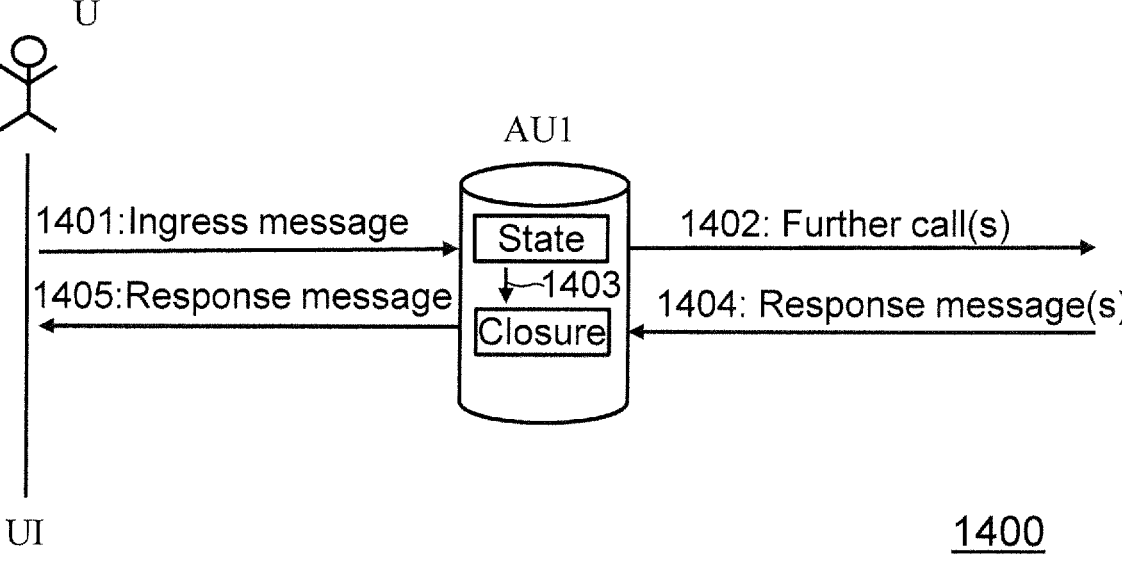
FIG. 14 illustrates how a primary application unit may use closures to manage calls to secondary application units.

FIG. 14 illustrates how the primary application unit AU1 that receives an ingress message may use closures to manage calls to secondary application units.

At a step 1401, the user U sends an ingress message to the application unit AU1. The application unit AU1 serves as primary application unit. At one or more steps 1402, the application unit AU1 sends further calls to one or more secondary application units.

At a step 1403, the application unit AU1 stores its current state including the call context as closure.

At one or more steps 1404, the secondary application units send one or more responses/results as response messages back to the application unit AU1. The application unit AU1 uses then the state stored in the closure to process the response messages and provides, at a step 1405, a response message back to the user U.

FIG. 15 shows a flow chart of method steps of a computer-implemented method for charging for a use of network resources of a distributed network according to an embodiment of the invention.

At a step 1510, the distributed network runs on each of the plurality of nodes one or more application (computational) units.

At a step 1520, a user of the network runs a local user gas account at a primary application unit.

At a step 1530, a user of the network sends an ingress message to the primary application unit.

At a step 1540, the primary application unit issues a call to a secondary application unit At a step 1550, the local user gas account of the primary application unit processes payments for the use of network resources by the primary and the secondary application unit.

At a step 1560, the secondary application unit performs the secondary application service and sends results of the secondary application service back to the primary application unit.

At a step 1570, the primary application unit performs the primary application service, including the use of the results of the secondary application service, and sends a response message back to the user.

Hence according to such a method the payments for the use of the network resources may be done locally from the local user gas account at the primary application unit. Furthermore, the payment may be processed before the call tree is fully executed.

FIG. 16 illustrates main processes which are run on each node 10 of the networks 100, 300, 1100 and 1300 according to an embodiment of the invention. A network client of networks according to embodiments of the invention is the set of protocol components that are necessary for a node 10 to participate in the network. According to embodiments, each node 10 is a member of a mainnet and typically one subnet, which means that each node runs a client for the mainnet and possibly a client for the subnet.

A node manager 40 is configured to start, restart and update a mainnet protocol client 41, a subnet protocol client 42 and a security application 43.

According to embodiments, each of the plurality of subnets 11 is configured to run a separate subnet protocol client 42 on its corresponding nodes 10. The mainnet protocol client 41 is in particular configured to distribute configuration data to and between the plurality of subnets 11. The mainnet protocol client 41 may be in particular configured to run only system computational units, but not any user-provided computational units. The mainnet protocol client 41 is the local client of the mainnet and the subnet protocol client 42 is the local client of the subnet.

The security application 43 stores secret keys of the nodes 10 and performs all operations with them.

The security application 43 is configured to protect the secret keys held by a node. More particularly, the secret keys are held and processed in a separate execution environment, (either a separate process or a separate virtual machine (VM)). The security application 43 is configured to operate with limited and controlled interfaces such that the secret keys cannot be extracted via these interfaces. According to embodiments, the security application is configured to operate like a hardware security module (HSM) or similar to a HSM. Hence the security application 43 may be denoted as a Software HSM.

Figure 17:
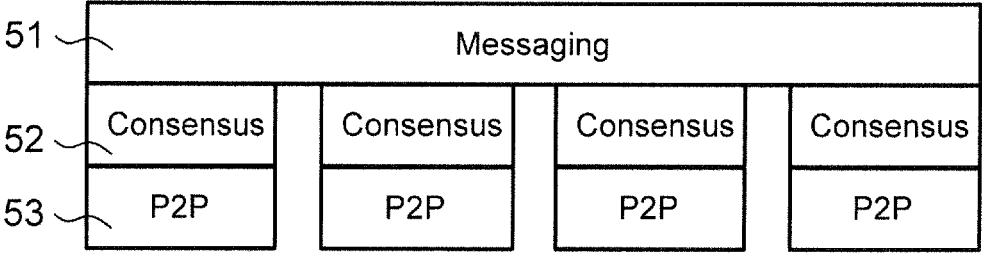
FIG. 17 shows a layer model illustrating main layers which are involved in the exchange of inter-subnet and intra-subnet messages.

FIG. 17 shows a layer model 1700 illustrating main layers which are involved in the exchange of inter-subnet and intra-subnet messages. The layer model 1700 comprises a messaging layer 51 which is configured to serve as an upper layer for the inter-subnet communication. More particularly, the messaging layer 51 is configured to route inter subnet messages between computational units of different subnets. Furthermore, the messaging layer 51 is configured to route ingress messages from users of the network to computational units of the network.

The layer model 1700 further comprises a plurality of consensus layers 52 which are configured to receive inter-subnet messages from different subnets as well as ingress messages and to organize them, in particular by agreeing on a processing order, in a sequence of input blocks which are then further processed by the respective subnet. In addition, the layer model 1700 comprises a peer-to-peer (P2P) layer 53 that is configured to organize and drive communication between the nodes of a single subnet.

According to embodiments, the network may comprise a plurality of further layers, in particular an execution layer which is configured to execute execution messages on the computational units of the network.

In the following the interactions between the mainnet protocol clients 41 and the subnet protocol clients 42 is described in more detail (see FIG. 16). The mainnet protocol clients 41 manage a number of registries that contain configuration information for the subnets. These registries are implemented by computational units on the mainnet and, as all nodes are participating in the mainnet, access to these registries can simply be implemented by a state read operation.

That is, the mainnet reader 610 (see FIG. 6) may be in fact a sub-component of the mainnet protocol client 41 and therefore interaction with this component results in interaction between the two isolated environments in which the mainnet and subnet clients run.

Figure 18:
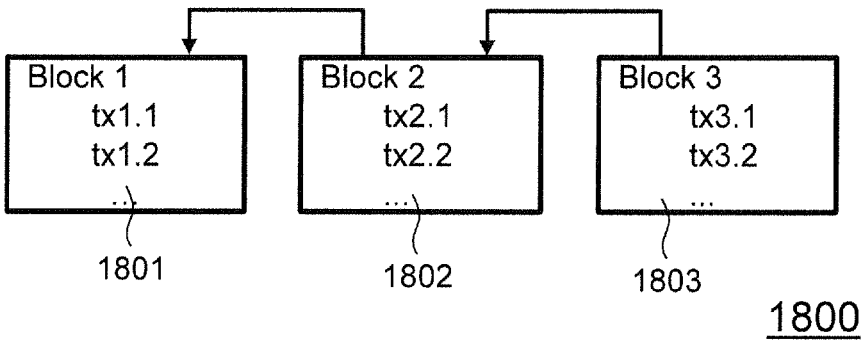
FIG. 18 illustrates the creation of input blocks by a consensus component according to an exemplary embodiment of the invention.

FIG. 18 illustrates the creation of blocks in distributed networks according to embodiments of the invention. The blocks may be in particular the input blocks 720 shown in FIG. 7 which are created by the consensus component 63 that runs the consensus protocol, in particular a local subnet consensus protocol.

In this exemplary embodiment three input blocks 1801, 1802 and 1803 are illustrated. Block 1801 comprises a plurality of transactions, namely the transactions tx1.1, tx1.2 and possibly further transactions indicated with dots. Block 1802 comprises also a plurality of transactions, namely the transactions tx2.1, tx2.2 and possibly further transactions indicated with dots. Block 1803 also comprises a plurality of transactions, namely the transactions tx3.1, tx3.2 and possibly further transactions indicated with dots. The input blocks 1801, 1802 and 1803 are chained together. More particularly, each of the blocks comprises a block hash of the previous block. This cryptographically ties the current block to the previous block(s).

According to embodiments the transactions may be inter-subnet messages, ingress messages and signalling messages.

According to embodiments, the input blocks 1801, 1802 and 1803 may be created by a proof-of-stake consensus-protocol.

However, it should be noted that the input blocks generated by the consensus component do not need to be chained together according to embodiments. Rather any consensus protocol that reaches some kind of consensus between the nodes of a subnet on the processing order of received messages may be used according to embodiments.

Figure 19:
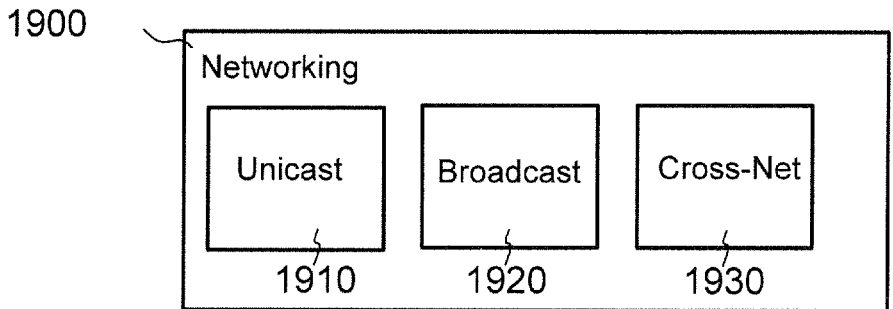
FIG. 19 shows a more detailed view of a networking component.

FIG. 19 shows a more detailed view of a networking component 1900, which is configured to run a networking protocol. The networking component 1900 may be e.g. a more detailed embodiment of the networking component 64 shown in FIG. 6. The networking component 1900 comprises a unicast component 1910 configured to perform a node-to-node communication, a broadcast component 1920 configured to perform an intra-subnet communication and a cross-net component 1930 configured to perform an inter-subnet communication.

Figure 20:
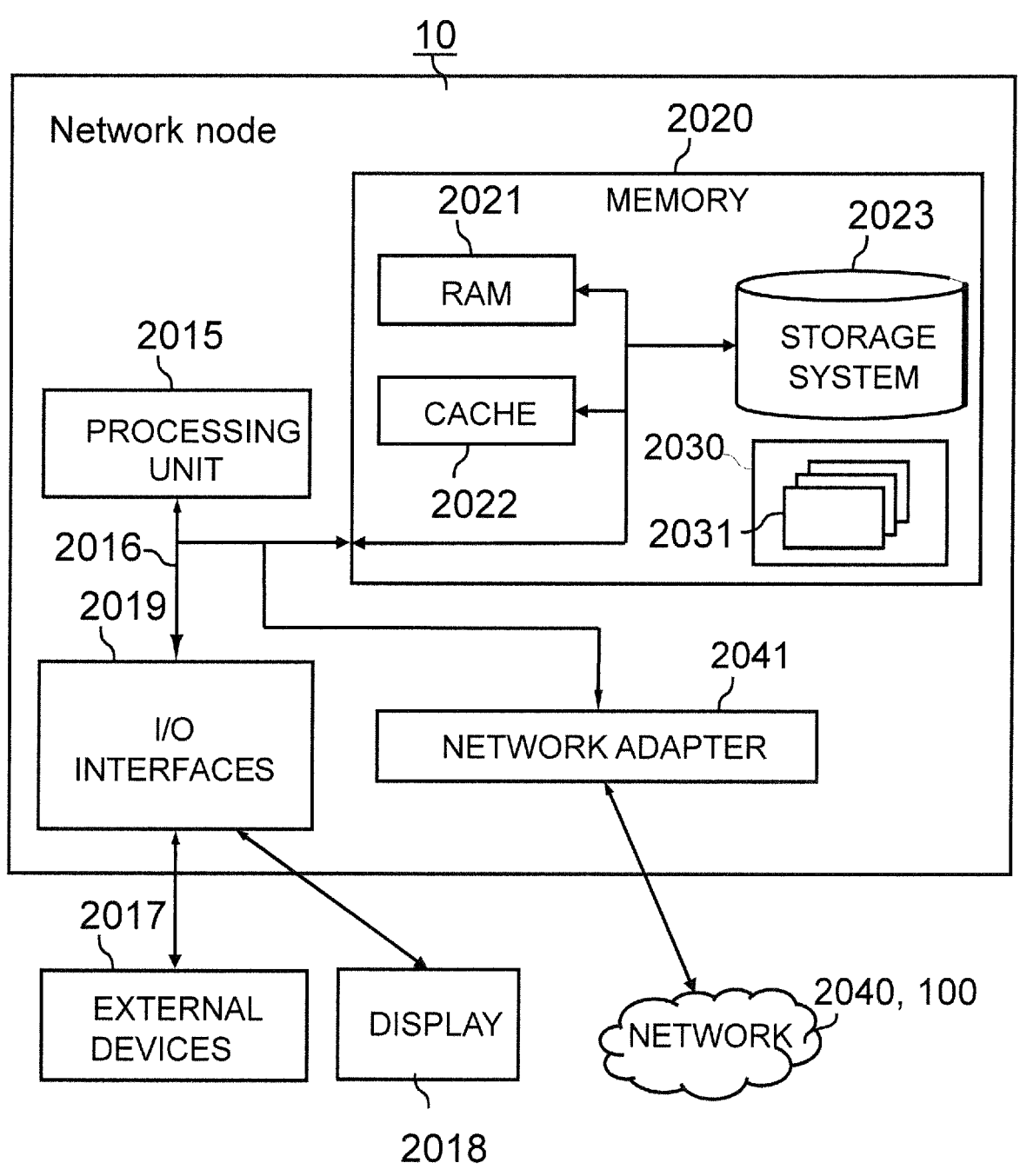
FIG. 20 shows an exemplary embodiment of a node according to an embodiment of the invention.

Referring now to FIG. 20, a more detailed block diagram of a network node 10 according to embodiments of the invention is shown, e.g. of the network 100 of FIG. 1. The network node 10 establishes a computing node that may perform computing functions and may hence be generally embodied as computing system or computer. The network node 10 may be e.g. a server computer. The network node 10 may be configured to perform a computer-implemented method for charging a use of network resources of a distributed network. The network node 10 may be operational with numerous other general purpose or special purpose computing system environments or configurations.

The network node 10 may be described in the general context of computer system-executable instructions, such as program modules, being executed by a computer system. Generally, program modules may include routines, programs, objects, components, logic, data structures, and so on that perform particular tasks or implement particular abstract data types. The network node 10 is shown in the form of a general-purpose computing device. The components of network node 10 may include, but are not limited to, one or more processors or processing units 2015, a system memory 2020, and a bus 2016 that couples various system components including system memory 2020 to processor 2015.

Bus 2016 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Network node 10 typically includes a variety of computer system readable media. Such media may be any available media that is accessible by network node 10, and it includes both volatile and non-volatile media, removable and non-removable media.

System memory 2020 can include computer system read-able media in the form of volatile memory, such as random access memory (RAM) 2021 and/or cache memory 2022. Network node 2010 may further include other removable/non-removable, volatile/non-volatile computer system storage media. By way of example only, storage system 2023 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 2016 by one or more data media interfaces. As will be further depicted and described below, memory 2020 may include at least one computer program product having a set (e.g., at least one) of program modules that are configured to carry out the functions of embodiments of the invention.

Program/utility 2030, having a set (at least one) of program modules 2031, may be stored in memory 2020 by way of example, and not limitation, as well as an operating system, one or more application programs, other program modules, and program data. Each of the operating system, one or more application programs, other program modules, and program data or some combination thereof, may include an implementation of a networking environment. Program modules 2031 generally carry out the functions and/or methodologies of embodiments of the invention as described herein. Program modules 2031 may carry out in particular one or more steps of a computer-implemented method for providing a user of a distributed network access to computational results computed by the distributed network, e.g. of one or more steps of the methods as described above.

Network node 10 may also communicate with one or more external devices 2017 such as a keyboard or a pointing device as well as a display 2018. Such communication can occur via Input/Output (I/O) interfaces 2019. Still yet, network node 10 can communicate with one or more networks 40 such as a local area network (LAN), a general wide area network (WAN), and/or a public network (e.g., the Internet) via network adapter 2041. According to embodiments the network 2040 may be in particular a distributed network comprising a plurality of network nodes 10, e.g. the network 100 as shown in FIG. 1. As depicted, network adapter 2041 communicates with the other components of network node 10 via bus 2016. It should be understood that although not shown, other hardware and/or software components could be used in conjunction with network node 10.

The network node 10 provides network resources for the corresponding distributed network. The network resources include in particular the processing unit 2015 and the memory 2020 including the storage system 2023.

Aspects of the present invention may be embodied as a system, in particular a distributed network comprising a plurality of subnets, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

Aspects of the present invention are described herein with reference to flowchart illustrations and/or block diagrams of methods, networks, apparatus (systems), and computer program products according to embodiments of the invention.

Computer readable program instructions according to embodiments of the invention may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of networks, systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

While there are shown and described presently preferred embodiments of the invention, it is to be distinctly understood that the invention is not limited thereto but may be otherwise variously embodied and practiced within the scope of the following claims.

The invention claimed is:

1. A computer-implemented method for charging for a use of resources of a distributed network, the distributed network comprising a plurality of nodes, wherein each of the plurality of nodes comprises a processor and a memory and is configured to run one or more application units for providing application services to users of the distributed network; wherein each of the application units comprises its own unit state;

the distributed network comprises a plurality of subnets; and each of the plurality of subnets comprises one or more of the plurality of nodes;

the method comprising:

assigning each of the application units to one of the plurality of subnets;

running, by the one or more application units, an application unit gas account which is owned by the respective application unit, wherein the unit states of the one or more application units comprise as system states the application unit gas accounts;

using, by the one or more application units, the application unit gas account to pay for its use of network resources;

using, by the one or more application units, the application unit gas account to receive payments from other application unit gas accounts;

sending a payment message between a first application unit of the one or more application units and a second application unit of the one or more application units to transfer a gas amount from the application unit gas account of the first application unit to the application unit gas account of the second application unit; and replicating the unit states of the application units including the application unit gas accounts across the respective subnet by performing an active replication in space of the unit states of the application units including the application unit gas accounts on each node of the respective subnet.

2. The computer-implemented method according to claim 1, comprising:

running, by a user of the network, one or more local user gas accounts at one or more of the ap-plication units;

processing, via one or more local user gas accounts, charges for the use of the resources of the distributed network;

sending, by a user of the network, an ingress message for requesting a primary application ser-vice to a primary application unit of the one or more application units;

performing, by the primary application unit, the primary application service; and processing, via the local user gas account of the user at the primary application unit, charges for the use of the resources by the primary application service, wherein a local user gas account is a local user accounting unit configured to locally pay for the use of resources of the distributed network.

3. The computer-implemented method according to claim 2, wherein performing the primary application service comprises issuing, by the primary application unit, one or more calls to one or more secondary application units; and the method further comprises performing, by the one or more secondary application units, one or more secondary application services; and performing the one or more secondary application services comprises issuing, by the one or more secondary application units, one or more calls to further secondary application units; and the method further comprises performing, by the one or more further secondary application units, one or more further secondary application services.

4. The computer-implemented method according to claim 3, wherein the one or more calls are performed successively, thereby forming a call tree of arbitrary depth.

5. The computer-implemented method according to claim 2, further comprising:

processing, via the local user gas account of the primary application unit, payments for the use of the resources by the one or more secondary application services.

6. The computer-implemented method according to claim 2, further comprising:

running, by a user of the network, one or more local user gas accounts at the one or more secondary application units; and processing, via one or more local user gas accounts of the secondary application units, payments for the use of the resources by the one or more secondary application services.

7. The computer-implemented method according to claim 1, further comprising:

running, by one or more users of the network, in particular by each user of the network, a wallet computational unit, the wallet computational unit being configured to manage a user currency account for the user; and sending a payment message from the wallet computational unit to a respective application unit to transfer a currency amount from the user currency account to the local user gas account at the respective application unit.

8. The computer-implemented method according to claim 2, further comprising:

charging separately for an acceptance of ingress messages, for read queries, for the execution of accepted ingress messages and/or for the execution of accepted unit-to-unit messages.

9. The computer-implemented method according to claim 8, wherein each of the local user gas accounts comprises:

an ingress sub-account configured to be charged for an acceptance of the ingress messages;

a read query sub-account configured to be charged for read queries; and an execution sub-account configured to be charged for the execution of accepted ingress messages and/or the execution of accepted unit-to-unit messages.

10. The computer-implemented method according to claim 8, further comprising:

applying different accounting periods and/or charging times for the ingress messages and the read queries.

11. The computer-implemented method according to claim 1, further comprising:

charging, by the distributed network, for use of storage resources of the distributed network; and debiting, from a respective application unit gas account, a fee for its use of the storage resources of the distributed network.

12. The computer-implemented method according to claim 1, further comprising:

charging, by one or more of the application units, a fixed price for the use of the resources by the corresponding application service.

13. The computer-implemented method according to claim 1, further comprising:

processing, by one or more of the application units, an advance payment for the use of the resources by the corresponding application service; and reimbursing, by the one or more application units, unused parts of the advance payment.

14. The computer-implemented method according to claim 13, further comprising:

topping up, from an application unit gas account of a respective primary and/or secondary application unit, the advance payment to ensure execution of the corresponding primary and/or secondary application service.

15. A distributed network comprising a plurality of nodes, wherein each of the plurality of nodes comprises a processor and a memory and is configured to run one or more application units for providing application services to users of the distributed network;

each of the application units comprises its own unit state;

the distributed network comprises a plurality of subnets; and each of the plurality of subnets comprises one or more of the plurality of nodes;

wherein the distributed network is configured to:

provide resources for the application units;

assign each of the application units to one of the plurality of subnets;

run, by the one or more application units, an application unit gas account which is owned by the respective application unit, wherein the unit states of the one or more application units comprise as system states the application unit gas accounts;

use, by the one or more application units, the application unit gas account to pay for its use of network resources;

use, by the one or more application units, the application unit gas account to receive payments from other application unit gas accounts;

send a payment message between a first application unit of the one or more application units and a second application unit of the one or more application units to transfer a gas amount from the application unit gas account of the first application unit to the application unit gas account of the second application unit; and replicate the unit states of the application units including the application unit gas accounts across the respective subnet by performing an active replication in space of the unit states of the application units including the application unit gas accounts on each node of the respective subnet.

16. The node for a distributed network according to claim 15, wherein the node is configured to:

run one or more application units for providing application services to users of the distributed network;

replicate the unit states of the application units across the respective subnet;

run, by the one or more application units, an application unit gas account which is owned by the respective application unit;

use, by the one or more application units, the application unit gas account to pay for its use of network resources;

use, by the one or more application units, the application unit gas account to receive payments from other application unit gas accounts; and send a payment message between a first application unit of the one or more application units and a second application unit of the one or more application units to transfer a gas amount from the application unit gas account of the first application unit to the application unit gas account of the second application unit.

17. A computer program product for operating a distributed network, the distributed network comprising a plurality of nodes, the computer program product comprising a non-transitory computer readable storage medium having program instructions embodied therewith, the program instructions executable by one or more of the plurality of nodes, each comprising a processor and a memory, to cause the one or more of the plurality of nodes to perform a method comprising:

running, by the plurality of nodes, one or more application units for providing application services to users of the distributed network, wherein each of the application units comprises its own unit state; the distributed network comprises a plurality of subnets and each of the plurality of subnets comprises one or more of the plurality of nodes;

assigning each of the application units to one of the plurality of subnets;

running, by the one or more application units, an application unit gas account which is owned by the respective application unit, wherein the unit states of the one or more application units comprise as system states the application unit gas accounts;

using, by the one or more application units, the application unit gas account to pay for its use of network resources;

using, by the one or more application units, the application unit gas account to receive payments from other application unit gas accounts;

sending a payment message between a first application unit of the one or more application units and a second application unit of the one or more application units to transfer a gas amount from the application unit gas account of the first application unit to the application unit gas account of the second application unit; and replicating the unit states of the application units including the application unit gas accounts across the respective subnet by performing an active replication in space of the unit states of the application units including the application unit gas accounts on each node of the respective subnet.

18. A computer program product for operating a node of a distributed network, the computer program product comprising a non-transitory computer readable storage medium having program instructions embodied therewith, the program instructions executable by a processor of the node to cause the node to perform a method comprising:

running, by the node, one or more application units for providing application services to users of the distributed network;

running, by the one or more application units, an application unit gas account which is owned by the respective application unit, wherein the unit states of the one or more application units comprise as system states the application unit gas accounts;

using, by the one or more application units, the application unit gas account to pay for its use of network resources;

using, by the one or more application units, the application unit gas account to receive payments from other application unit gas accounts;

sending a payment message between a first application unit of the one or more application units and a second application unit of the one or more application units to transfer a gas amount from the application unit gas account of the first application unit to the application unit gas account of the second application unit; and replicating the unit states of the application units including the application unit gas accounts across the respective subnet by performing an active replication in space of the unit states of the application units including the application unit gas accounts on each node of the respective subnet.

* * * * *